(12) United States Patent
Ikezaki et al.

(10) Patent No.: US 11,931,974 B2
(45) Date of Patent: *Mar. 19, 2024

(54) FILAMENT WINDING APPARATUS

(71) Applicant: Murata Machinery, Ltd., Kyoto (JP)

(72) Inventors: Shu Ikezaki, Kyoto (JP); Motohiro Tanigawa, Kyoto (JP); Tadashi Uozumi, Kyoto (JP); Hirotaka Wada, Kyoto (JP); Masatsugu Goyude, Kyoto (JP); Shota Miyaji, Kyoto (JP); Takahiro Miura, Kyoto (JP); Makoto Tanaka, Kyoto (JP); Daigoro Nakamura, Kyoto (JP); Tetsuya Matsuura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 471 days.

This patent is subject to a terminal disclaimer.

(21) Appl. No.: 17/293,069

(22) PCT Filed: Nov. 12, 2019

(86) PCT No.: PCT/JP2019/044240
§ 371 (c)(1),
(2) Date: May 12, 2021

(87) PCT Pub. No.: WO2020/100853
PCT Pub. Date: May 22, 2020

(65) Prior Publication Data
US 2021/0402715 A1   Dec. 30, 2021

(30) Foreign Application Priority Data
Nov. 15, 2018   (JP) ................... 2018-214991

(51) Int. Cl.
*B29C 70/30*   (2006.01)
*B29C 70/16*   (2006.01)
(Continued)

(52) U.S. Cl.
CPC .............. *B29C 70/32* (2013.01); *B29C 70/16* (2013.01); *B65H 54/10* (2013.01); *B65H 81/06* (2013.01)

(58) Field of Classification Search
CPC ......... B29C 70/32; B29C 70/16; B29C 70/54; B29C 53/70; B29C 53/821; B65H 54/10; B65H 81/06; B65H 2701/31
See application file for complete search history.

(56) References Cited

U.S. PATENT DOCUMENTS 6,499,689 B1 * 12/2002 Miyazaki .............. H01F 41/082
                                                    242/411
9,636,874 B2 *  5/2017 Hatta ...................... B29C 71/02
(Continued)

FOREIGN PATENT DOCUMENTS

CN     206940091 U  *  1/2018
CN     215644099 U  *  1/2022
(Continued)

*Primary Examiner* — Emmanuel M Marcelo
(74) *Attorney, Agent, or Firm* — DLA Piper LLP (US)

(57) ABSTRACT

A filament winding apparatus includes a rail extending in a first direction, a core material support device that supports a core material, and a winding device that winds a fiber bundle onto an outer peripheral surface of the core material, the winding device including: a guide unit having an opening through which the core material passes, and guiding the fiber bundle; and a main frame on which the guide unit is mounted; wherein the main frame is movable relative to the core material in the first direction, the main frame is movable in a second direction orthogonal to the first direction, and the main frame is rotatable around a first rotational axis extending in a third direction orthogonal to each of the first direction and the second direction.

9 Claims, 14 Drawing Sheets

(51) Int. Cl.
*B29C 70/32* (2006.01)
*B65H 54/10* (2006.01)
*B65H 81/06* (2006.01)

(56) References Cited

U.S. PATENT DOCUMENTS

| | | | |
|---|---|---|---|
| 9,751,719 B2* | 9/2017 | Tanigawa | B29C 53/602 |
| 11,130,274 B2* | 9/2021 | Tanigawa | B65H 67/06 |
| 2003/0025026 A1* | 2/2003 | Rieser | H02K 15/095 |
| | | | 242/432.3 |
| 2006/0174998 A1 | 8/2006 | Takagi et al. | |
| 2009/0038759 A1* | 2/2009 | Uozumi | B29C 53/828 |
| | | | 156/425 |
| 2010/0083815 A1 | 4/2010 | Inazawa et al. | |
| 2015/0048195 A1 | 2/2015 | Tanigawa et al. | |
| 2015/0290882 A1* | 10/2015 | Hatta | B29C 53/8016 |
| | | | 156/441 |
| 2021/0394461 A1* | 12/2021 | Ikezaki | B65H 54/10 |

FOREIGN PATENT DOCUMENTS

| | | | | |
|---|---|---|---|---|
| CN | 219470413 U | * | 8/2023 | |
| EP | 2565307 A2 | * | 3/2013 | B65H 59/40 |
| JP | S61-290040 A | | 12/1986 | |
| JP | 2006-218777 A | | 8/2006 | |
| JP | 2009-039999 A | | 2/2009 | |
| JP | 2010094002 A | * | 4/2010 | |
| JP | 2013-193315 A | | 9/2013 | |
| JP | 2015-145104 A | | 8/2015 | |
| JP | 6051838 B2 | | 12/2016 | |
| JP | 6251070 B2 | | 12/2017 | |
| JP | 2018-144407 A | | 9/2018 | |

* cited by examiner

FIG. 6
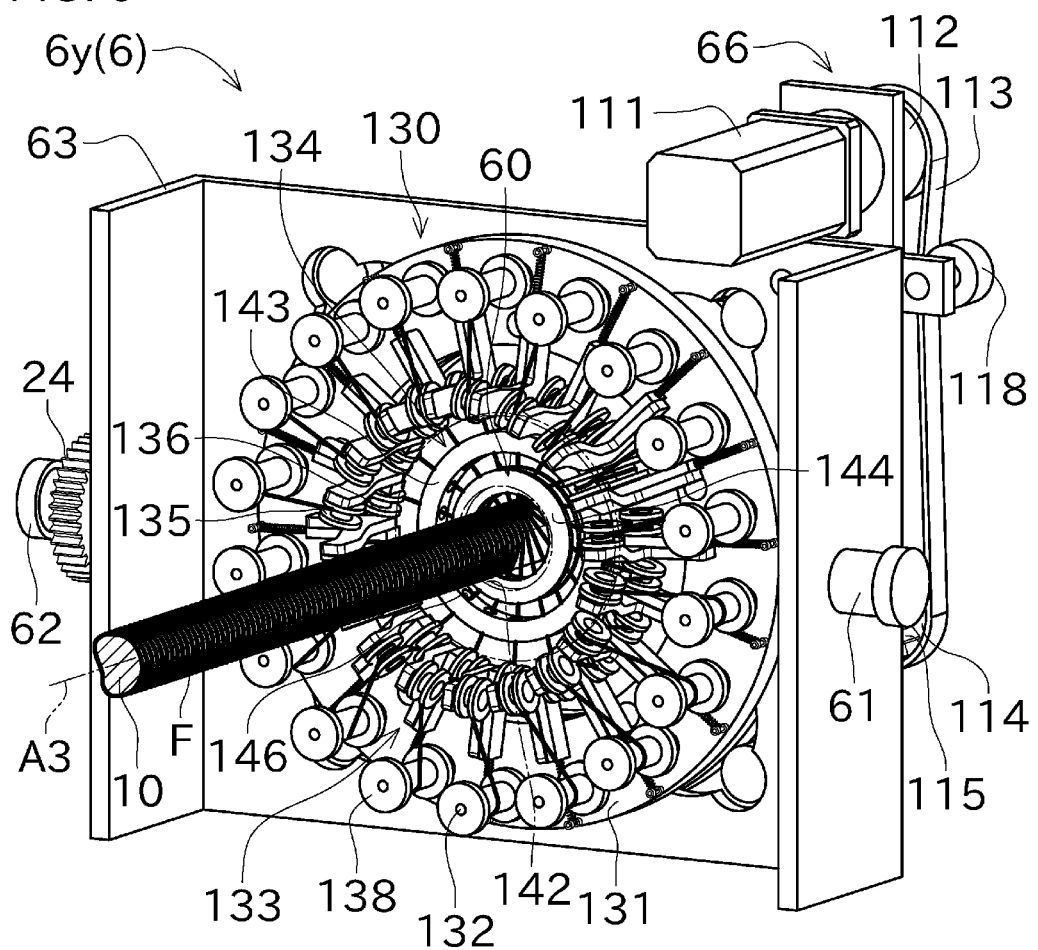
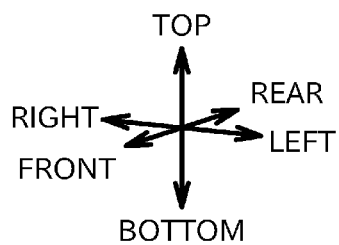

FIG. 9
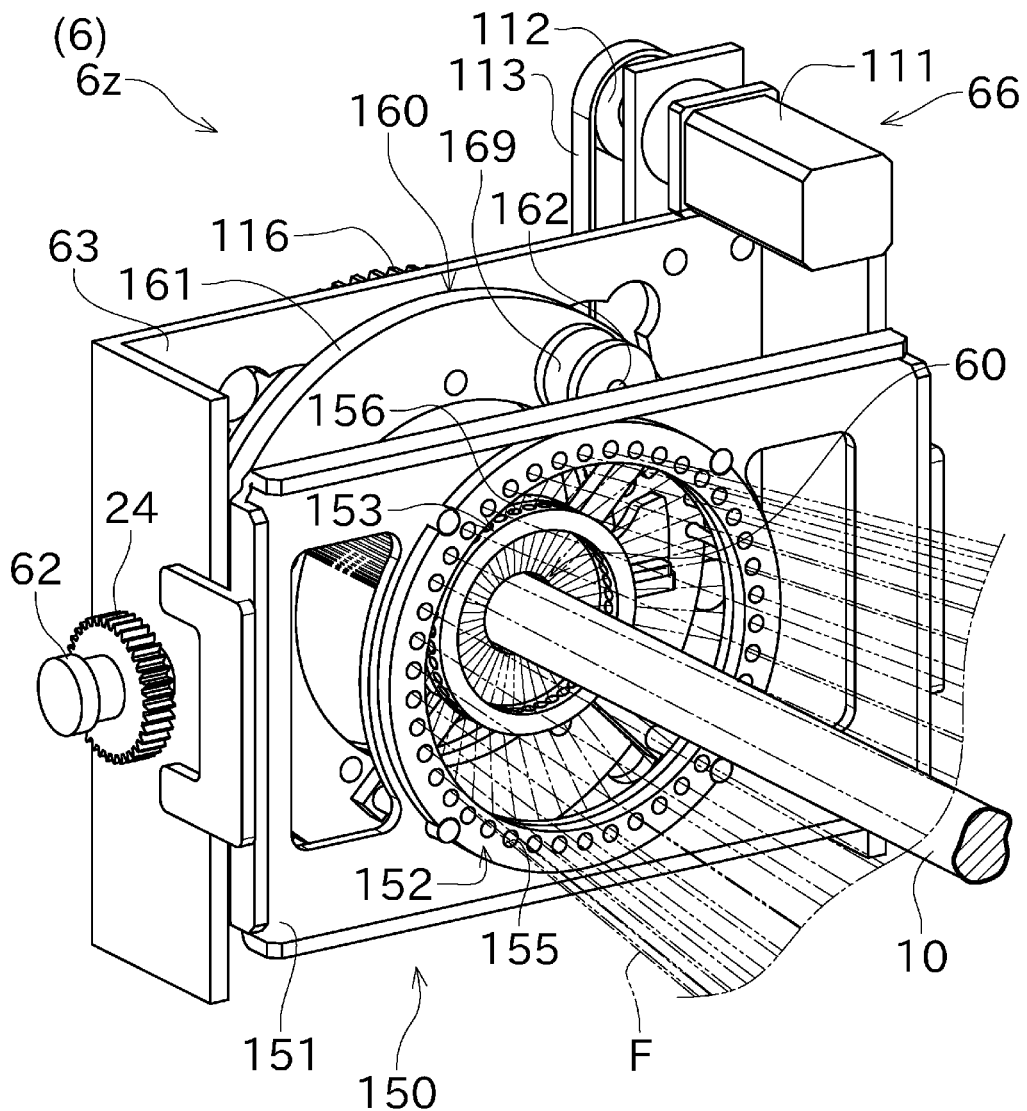
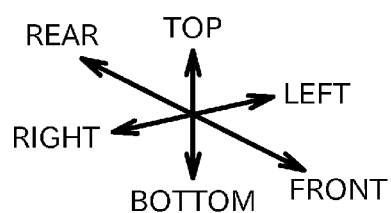

FIG. 12
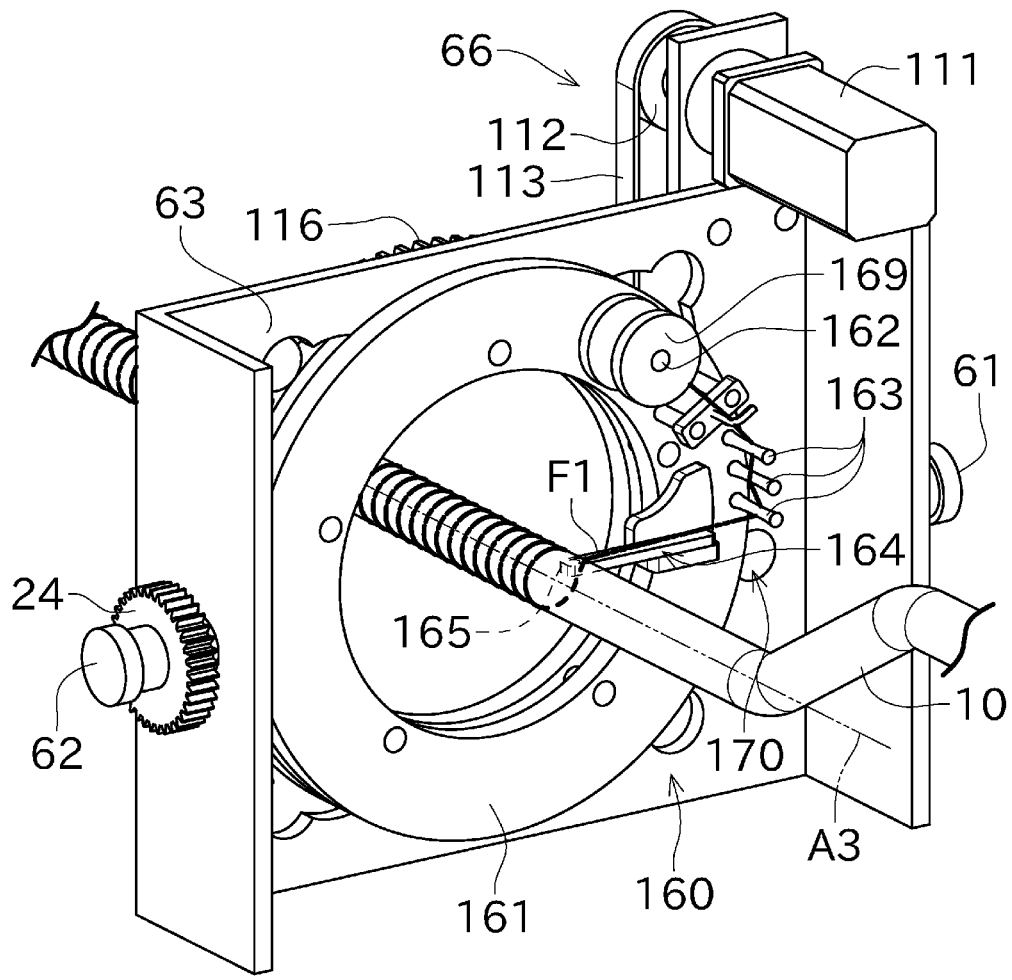
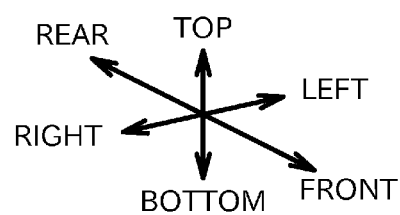

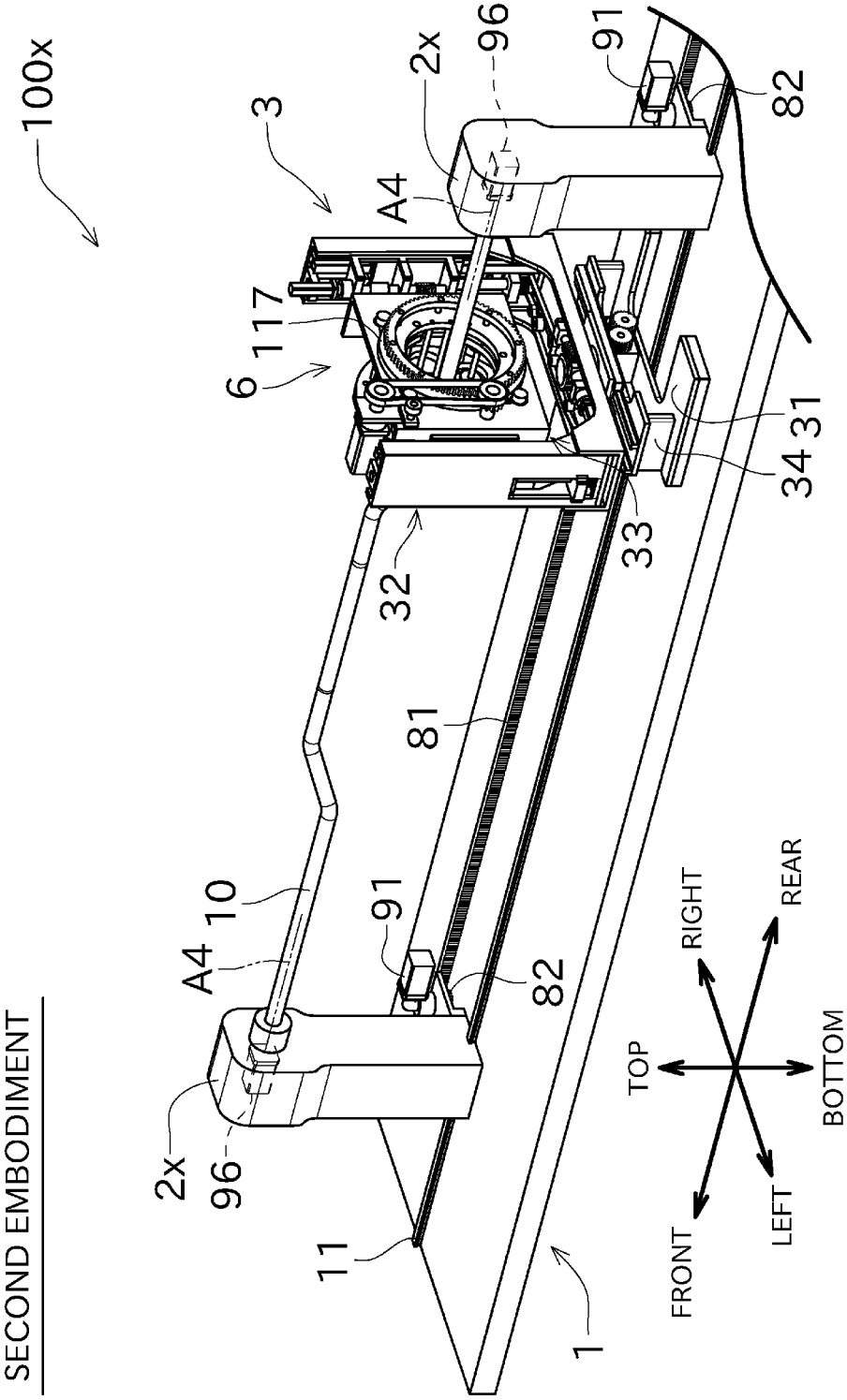

FILAMENT WINDING APPARATUS

TECHNICAL FIELD

This disclosure relates to a filament winding apparatus.

BACKGROUND

Conventionally, a bundle of filaments (fiber bundle) is wound around a core material to obtain a member of a predetermined shape. Japanese Patent Nos. 6051838 and 6251070 disclose this kind of configuration.

JP '838 discloses a following curved-shape pipe manufacturing apparatus. In that apparatus, fiber bundles are fed out substantially parallel to a center axis of the core material (0° winding is applied). Thereafter, a fiber bundle different from the above-described fiber bundles is wound onto the core material and the fiber bundles around thereof in a direction substantially perpendicular to the center axis of the core material to tighten. In that configuration, the fiber bundles can be wound by other fiber bundles to be tightened. Accordingly, the fiber bundles can be prevented from striping from the core material.

JP '838 discloses a following curved-shape pipe manufacturing method. The core material has a linear shape. The fiber bundles located around the core material are wound by the other fiber bundles to be tightened. Thereafter, the core material covered by the fiber bundles and the other fiber bundle can be bent. JP '838 states that a curved pipe with improved stiffness can be obtained by the fiber bundles and the other fiber bundle covering the core material.

JP '070 discloses a following axial composite member manufacturing method. Prepregs are attached to each of straight portions and bent portions of a core metal along the axial direction of the core metal (0° winding is applied). Thereafter, a heat-shrinkable tape is wound around the core metal on which the prepregs are attached. In that method, while positions of the prepregs attached on the core metal are held by a rubber member, the prepreg can be restrained by the heat-shrinkable tape.

JP '838 does not disclose the configuration that the fiber bundles are attached around the core material which is bent from the beginning, and the other fiber bundle is wound to tighten around the core material and the fiber bundles located around the core material. That is, the configuration of JP '838 is not supposed to be applied to a core material which is already bent. JP '070 does not disclose the specific structure such that the prepregs move relatively to the core metal to attach to the bent portions before the heat-shrinkable tape is wound.

It could therefore be helpful to provide a filament winding apparatus that can smoothly wind fiber bundles onto a core material having a curved shape.

SUMMARY

We provided a filament winding apparatus having the following configuration. The filament winding apparatus includes a rail, a core material support device and a winding device. The rail extends in a first direction. The core material support device supports a core material. The winding device winds a fiber bundle onto an outer peripheral surface of the core material. The winding device includes a guide unit and a main frame. The guide unit has an opening through which the core material passes and guides the fiber bundle. The guide unit is mounted on the main frame. The main frame is movable relative to the core material in the first direction. The main frame is movable in a second direction that is orthogonal to the first direction. The main frame is rotatable around a first rotational axis extending in a third direction orthogonal to each of the first direction and the second direction.

Accordingly, a position and a direction of the guide unit can be changed with respect to the core material. Therefore, the fiber bundle can be wound around the outer peripheral surface of the core material which is curved.

It is preferable that the filament winding apparatus is configured as follows. The filament winding apparatus includes a first drive source, a second drive source, a third drive source and a control device. The first drive source moves at least any of the core material support device and the winding device in the first direction. The second drive source moves the main frame in the second direction. The third drive source rotates the main frame around the first rotational axis. The control device controls the first drive source, the second drive source and the third drive source. The control device controls operations of the first drive source, the second drive source and the third drive source to adjust a posture of the guide unit such that a center of the opening always coincides with a center of the core material.

Accordingly, the fiber bundle can be wound automatically around the outer peripheral surface of the core material, while adjusting the posture of the guide unit in accordance with a shape of the core material which is curved.

It is preferable that the filament winding apparatus is configured as follows. The main frame includes a sub frame. The sub frame is mounted to be movable in the third direction. The guide unit is rotatably supported around a second rotational axis extending in the second direction by the sub frame.

Accordingly, the position and the direction of the winding unit can be changed in a three-dimensional manner with respect to the core material. Therefore, even if the core material is curved in a three-dimensional manner, the fiber bundle can be wound around the outer peripheral surface of the core material.

It is preferable that the filament winding apparatus is configured as follows. The filament winding apparatus includes a fourth drive source, a fifth drive source and a control device. The fourth drive source moves the sub frame in the third direction. The fifth drive source rotates the guide unit around the second rotational axis. The control device controls the fourth drive source and the fifth drive source. The control device controls operations of the fourth drive source and the fifth drive source to adjust a posture of the guide unit such that a center of the opening always coincides with a center of the core material.

Accordingly, the fiber bundle can be wound automatically around the outer peripheral surface of the core material, while adjusting the posture of the winding unit in accordance with the shape of the core material which is curved in a three-dimensional manner.

It is preferable that the filament winding apparatus is configured as follows. The core material support device supports the core material rotatably around a third rotational axis being parallel to the first direction. The core material support device includes a sixth drive source that rotates the core material around the third rotational axis.

Accordingly, even if the core material is curved in a complicated three-dimensional manner, for example, by rotating the core material in accordance with the shape of the core material (curvature), the posture of the core material can be changed such that the winding device winds the fiber bundles easily. Therefore, the scope of application of the filament winding apparatus can be expanded and the fiber bundle can be wound on the core material of various shapes.

It is preferable that the filament winding apparatus is configured as follows. The guide unit includes a plurality of bobbin mounting parts and a fiber bundle guiding part. Bobbins on which the fiber bundles are wound are mounted to the plurality of the bobbin mounting parts. The fiber bundle guiding part simultaneously guides the fiber bundles from the bobbins which are mounted respectively to the plurality of bobbin mounting parts to the core material.

Accordingly, the plurality of fiber bundles can be guided preferably. The plurality of fiber bundles can be wound simultaneously by a simple configuration.

It is preferable that the filament winding apparatus is configured as follows. The guide unit includes a tightening part, a unit frame and a fixed fiber bundle guiding part. The tightening part rotates around a center of the opening. The unit frame rotatably supports the tightening part. The fixed fiber bundle guiding part is fixed to the unit frame. The tightening part includes a bobbin supporting part and a tightening material guiding part. The bobbin supporting part supports a tightening material bobbin on which a tightening material is wound. The tightening material guiding part guides the tightening material to the core material. The fixed fiber bundle guiding part simultaneously guides the plurality of fiber bundles to the core material.

Accordingly, the 0° winding, in which the fiber orientation angle is 0° relative to the axial direction of the core material, can be easily performed.

The filament winding apparatus includes a creel stand. The creel stand supports each of bobbins on which the fiber bundles are wound. The fiber bundles are guided by the fixed fiber bundle guiding part.

Accordingly, the guide unit does not need to support bobbins. This can realize reduction in size and simplification of the winding device.

It is preferable that the filament winding apparatus is configured as follows. The winding device includes a base frame that is movable in the first direction relative to the core material. The base frame supports the main frame from below.

Accordingly, the stability of the main frame can be improved.

BRIEF DESCRIPTION OF THE DRAWINGS

FIG. 6 is a perspective view showing a configuration of a helical winding unit.

FIG. 9 is a perspective view showing a configuration of a 0° winding unit.

FIG. 12 is a perspective view showing a configuration of a 0° winding tightening part.

FIG. 14 is a perspective view showing a configuration of a filament winding apparatus according to a second example.

Figure 1:
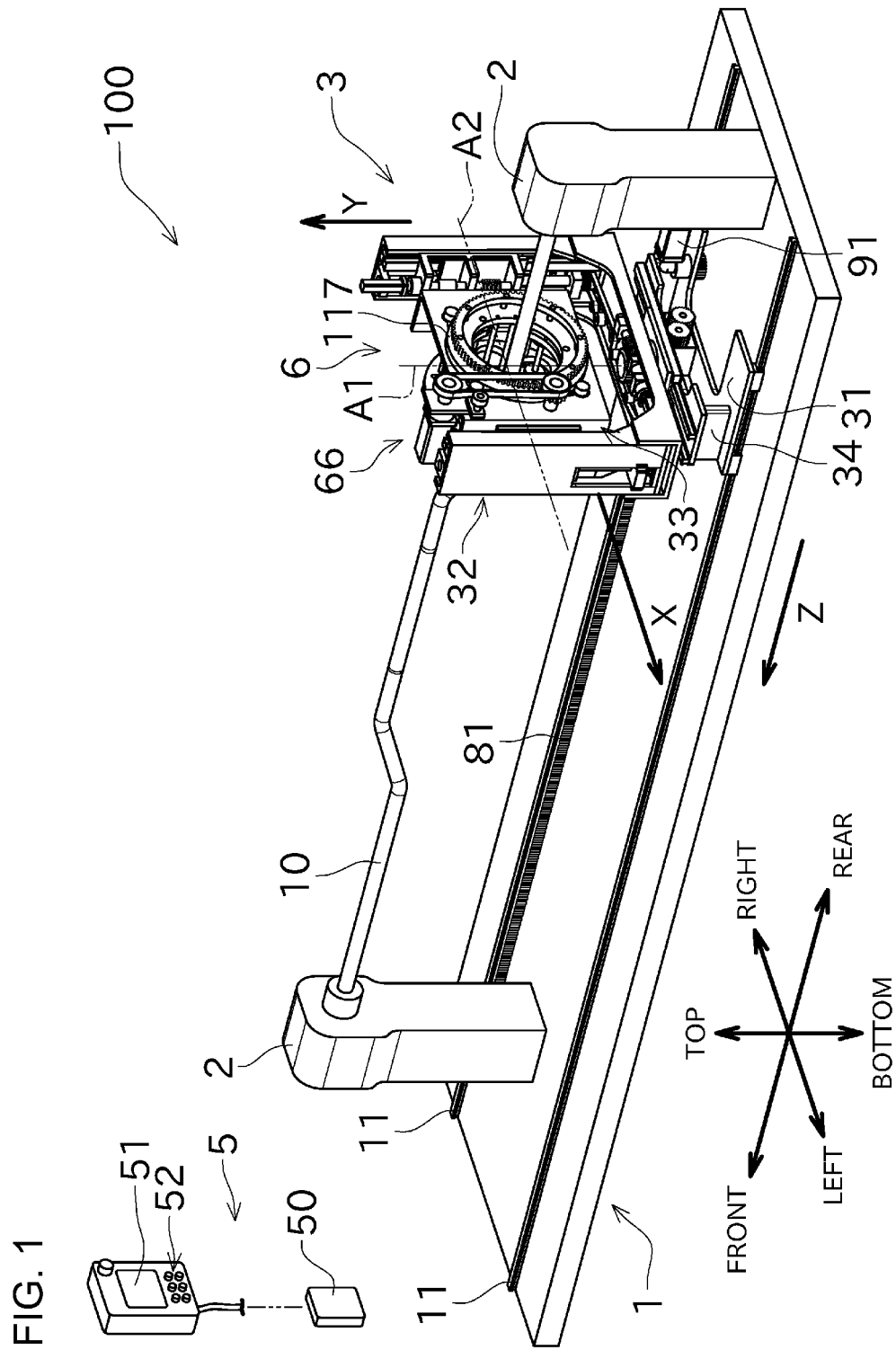
FIG. 1 is a perspective view showing an overall configuration of a filament winding apparatus according to a first example.

DESCRIPTION OF THE REFERENCE NUMERALS 2 core material support device
3 winding device
4 winding unit (guide unit)
10 core material
11 rail
32 main frame
100 filament winding apparatus
A1 rotational axis (first rotational axis)
F fiber bundle

DETAILED DESCRIPTION

Figure 2:
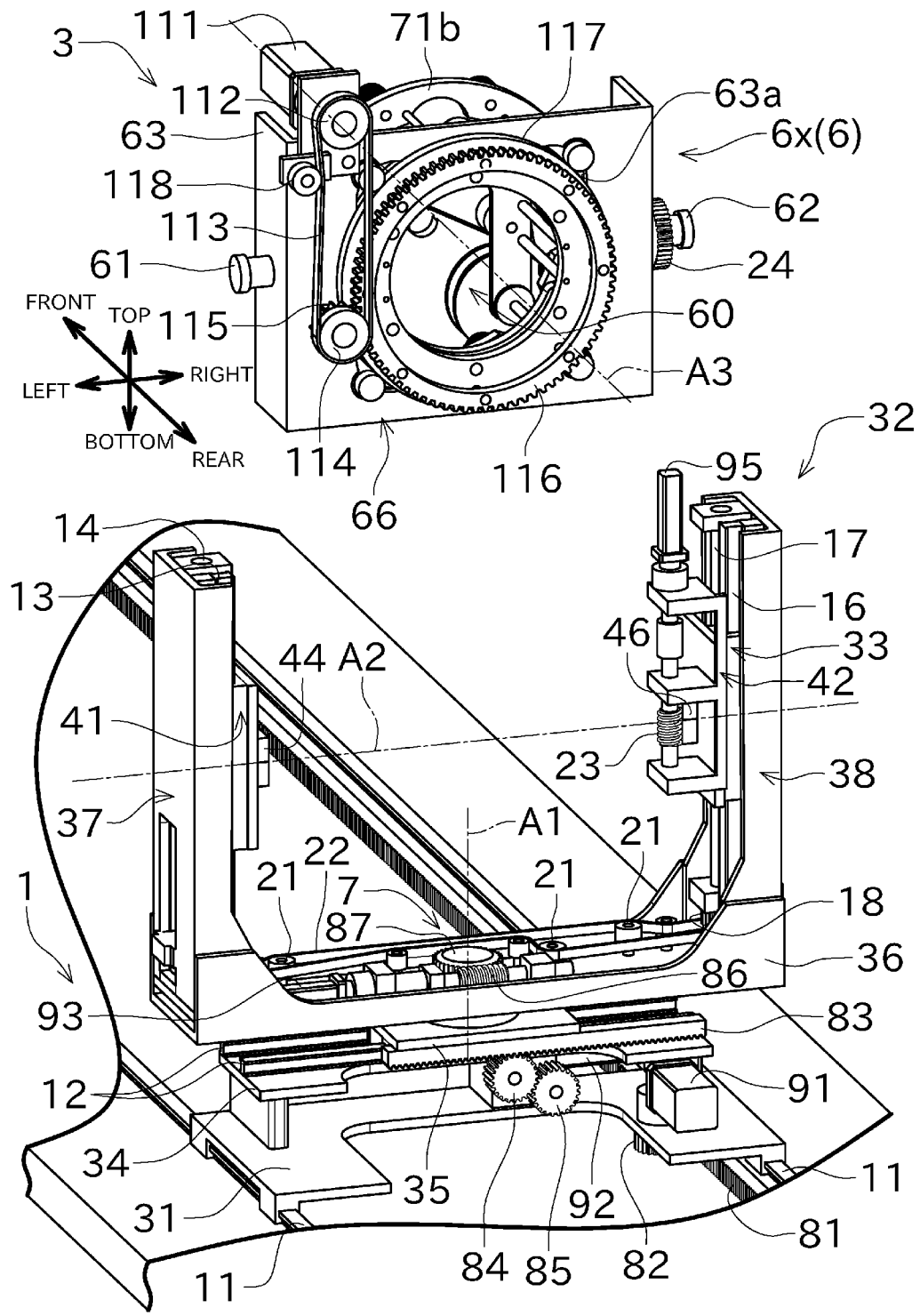
FIG. 2 is an exploded perspective view showing a winding device including a winding unit (hoop winding unit) viewed from the rear.
Figure 3:
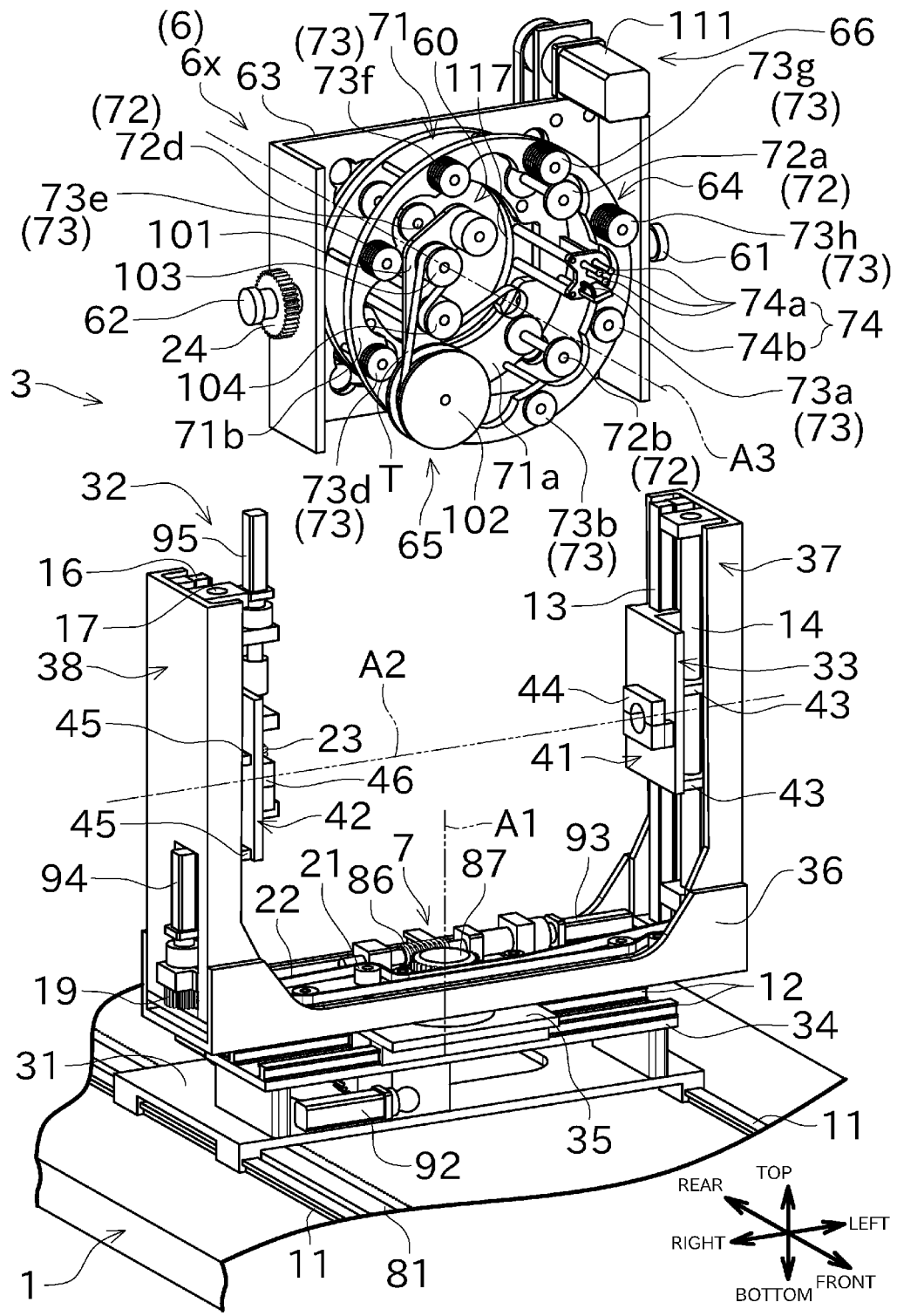
FIG. 3 is an exploded perspective view showing the winding device viewed from the front.

Next, an example will be described with reference to the drawings. FIG. 1 is a perspective view showing an overall configuration of a filament winding apparatus 100 according to a first example. FIG. 2 is an exploded perspective view showing a winding device 3 including a winding unit 6 (hoop winding unit 6x) viewed from the rear. FIG. 3 is an exploded perspective view showing the winding device 3 viewed from the front.

The filament winding apparatus 100 shown in FIG. 1 is an apparatus configured to wind a fiber bundle F onto an outer peripheral surface of a core material 10. The filament winding apparatus 100 includes a travel base 1, core material support devices 2, a winding device 3, and a control device 5.

"Front" in the following description means, in a direction where the travel base 1 extends, a side opposite to a position of a rotary table 117 which will be described later. "Rear" in the following description means, in the direction where the travel base 1 extends, a side where the rotary table 117 is positioned. "Left" and "Right" mean a left side and a right side when facing the front. The definition of these directions is for conveniently describing a positional relationship or the like between components. The orientation to arrange the filament winding apparatus 100 is not limited.

As described later, the core material 10 has a curved shape, but a front-rear direction (first direction) is a direction substantially along an overall longitudinal direction of the core material 10. A left-right direction (second direction) is orthogonal to the front-rear direction. A vertical direction (third direction) is orthogonal to the front-rear direction and the left-right direction respectively.

The travel base 1 is elongated in the front-rear direction. The travel base 1 supports the core material support devices 2, the winding device 3 and the like from below in the vertical direction. The travel base 1 includes a plurality of rails 11 extending in the front-rear direction. Each of the rails 11 is provided on an upper surface of the travel base 1.

The winding device 3 is mounted to the rails 11 to move back and forth in the front-rear direction along the rails 11.

The core material support devices 2 support the core material 10. Two core material support devices 2 are arranged side by side with a predetermined distance in the front-rear direction. The pair of core material support devices 2 is arranged to face each other. Each core material support device 2 is fixed to the travel base 1.

The two core material support devices 2 support the core material 10 such that an intermediate portion in a longitudinal direction of the core material 10 is raised above the travel base 1. One of the two core material support devices 2 holds a front end (one end in the longitudinal direction) of the core material 10, and the other core material support device 2 holds a rear end (the other end in the longitudinal direction) of the core material 10.

When the two core material support devices 2 support the core material 10, the core material 10 basically extends in the front-rear direction. An appropriate gap is formed in the vertical direction between the upper surface of the travel base 1 and the core material 10 supported by the two core material support devices 2.

The core material 10 has an elongated shape, for example, with its cross section having a circular rod-like shape. In this example, the core material 10, with its longitudinal direction three-dimensionally changing, has a curved shape.

The core material 10 can be mounted to and detached from each core material support device 2. Therefore, in accordance with a desired shape, the core material 10 having various shapes can be replaced and mounted to the filament winding apparatus 100.

The winding device 3 is configured as a device for winding a fiber bundle onto the outer peripheral surface of the core material 10, while traveling along the rails 11. The fiber bundle is made of, for example, fiber materials such as carbon fiber. The fiber bundle may be impregnated with liquid resin (for example, uncured thermosetting resin).

The winding device 3 is provided, on the travel base 1, between the two core material support devices 2. The winding device 3 keeps a state in which the core material 10 supported by the two core material support devices 2 penetrates the winding device 3 when moving back and forth in the front-rear direction along the rails 11.

As shown in FIGS. 2 and 3, the filament winding apparatus 100 includes a front-rear traveling drive motor (first drive source) 91, a left-right traveling drive motor (second drive source) 92, a rotary drive motor (third drive source) 93, a lifting motor (fourth drive source) 94, and a pitching drive motor (fifth drive source) 95. Each component in the winding device 3 is driven by each of the above-described drive motors. Details of a configuration for driving will be described later.

The control device 5 shown in FIG. 1 including a controller 50, a display 51, and an operation part 52, controls operations of each component in the winding device 3.

The controller 50 is configured as a control board, for example. The controller 50 is electrically connected to the above-described drive motors for driving each component in the winding device 3. The controller 50 controls each drive motor in accordance with operations of the operation part 52.

The display 51 can display various information regarding a winding work (such as a progress of the winding work).

The operation part 52 is used for manually controlling the front-rear traveling drive motor 91, the left-right traveling drive motor 92, the rotary drive motor 93, the lifting motor 94, the pitching drive motor 95, and a winding drive motor 111, or used for inputting various winding information.

The operator inputs the winding information (an initial setting value, a winding angle or the like) regarding the core material 10 to be wound, via the operation part 52. Based on the inputted winding information, the control device 5 controls a target rotational speed of the winding unit 6, a target traveling speed in which the winding device 3 travels in the front-rear direction, and a target posture of the winding device 3 corresponding to respective positions in the front-rear direction.

Figure 4:
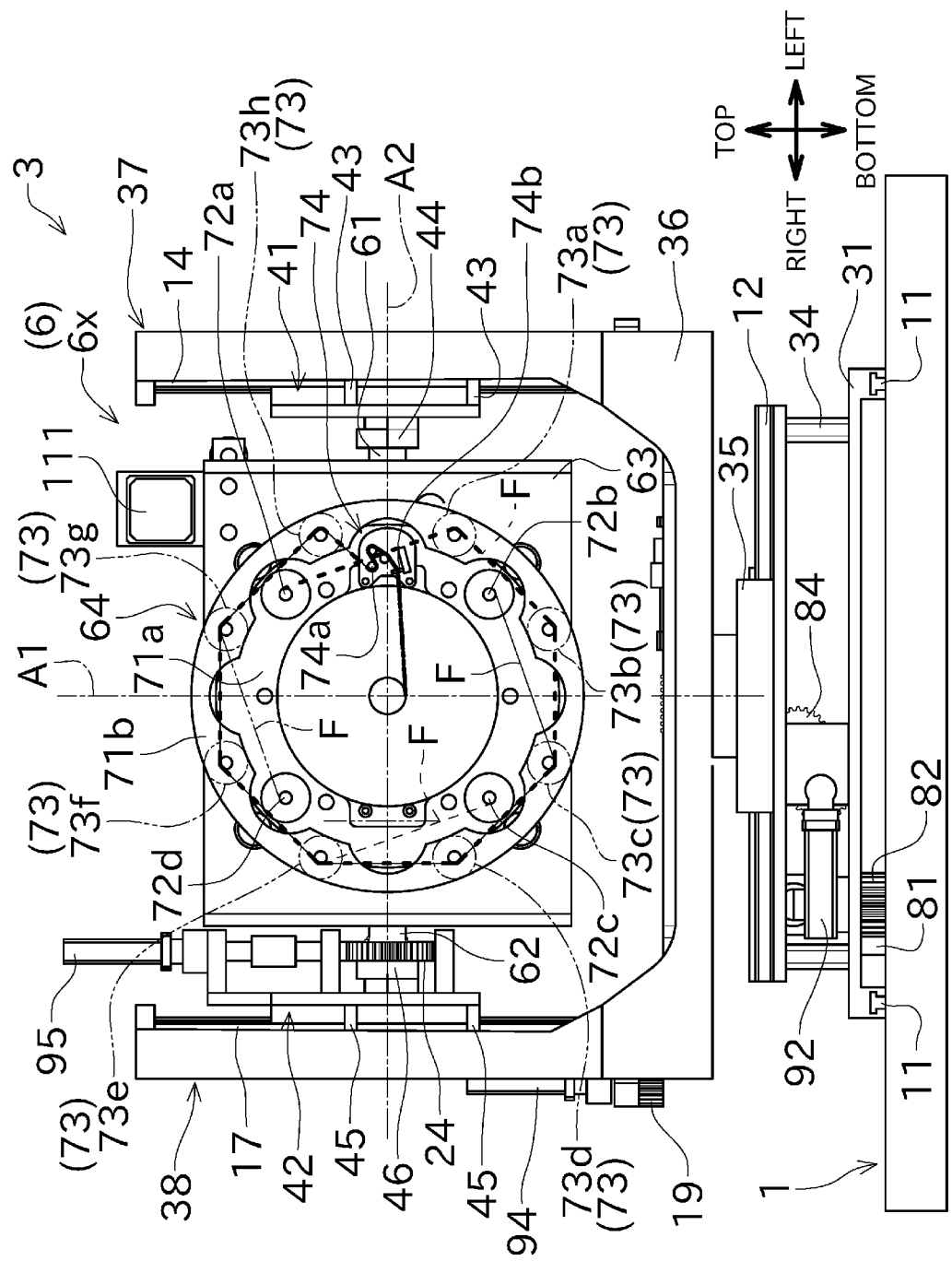
FIG. 4 is a front view showing the winding device.

Next, details of the winding device 3 will be described with reference to FIGS. 2 to 4. FIG. 4 is a front view showing the winding device 3.

As shown in FIGS. 2 and 3, the winding device 3 includes a base frame 31, a main frame 32, a lifting frame (sub-frame) 33, and a winding unit (guide unit) 6.

As shown in FIG. 2, the base frame 31 made of a plate-shaped member, is arranged with its thickness direction facing up and down. The base frame 31 is mounted to move in the front-rear direction along the rails 11 provided on the upper surface of the travel base 1. The base frame 31 is driven to move back and forth in the front-rear direction by a linear motion mechanism including the front-rear traveling drive motor 91 and a rack and pinion.

Specifically, a front-rear traveling rack 81 extending in the front-rear direction is arranged on the upper surface of the travel base 1. The front-rear traveling rack 81 is fixed to the travel base 1. The front-rear traveling rack 81 has tooth for meshing with the front-rear traveling pinion 82.

The front-rear traveling pinion 82 is rotatably supported below the base frame 31. The front-rear traveling pinion 82 is driven in rotation by the front-rear traveling drive motor 91 provided on the upper surface of the base frame 31.

The front-rear traveling drive motor 91 drives the front-rear traveling pinion 82 in rotation. The front-rear traveling pinion 82 to be rotated moves in the front-rear direction to roll with respect to the front-rear traveling rack 81. As a result, the base frame 31 (and thus the winding device 3) moves in the front-rear direction.

A support base 34 that supports the main frame 32 is provided across an upper surface of the base frame 31. The support base 34 is formed in a substantially U-shape with its lower side open, as viewed in the front-rear direction. Left and right rails 12 extending in the left-right direction are provided on the upper surface of the support base 34.

The main frame 32 is formed in a substantially U-shape with its upper side open, as viewed in the front-rear direction. The main frame 32 arranged above the support base 34 is mounted to the support base 34. The main frame 32 can move back and forth in the left-right direction along the left and right rails 12 provided on the upper surface of the support base 34. The main frame 32 is rotatable around a rotational axis (first rotational axis) A1 extending in the vertical direction, with respect to the support base 34.

The main frame 32 supports the winding unit 6 such that the winding unit 6 can be rotated around a pitching axis (second rotational axis) A2 extending in the left-right direction. A turning of the winding unit 6 around the pitching axis A2 may be refereed as "pitching."

As shown in FIGS. 2 and 3, the main frame 32 includes a left-right traveling base 35, a base 36, a left arm 37, and a right arm 38.

The plate-like left-right traveling base 35 is mounted to move along the left and right rails 12 provided on the upper surface of the support base 34. A left-right traveling rack 83 is fixed on a lower surface of the left-right traveling base 35.

The left-right traveling rack 83 has tooth for meshing with a left-right traveling pinion 84.

The left-right traveling pinion 84 is provided above the base frame 31 and below the support base 34. The left-right traveling pinion 84 is supported to be rotated around an axis extending in the front-rear direction. The left-right traveling pinion 84 meshes with a first gear 85 arranged in the vicinity of and slightly below the left-right traveling pinion 84. The left-right traveling pinion 84 is driven in rotation due to rotation of the first gear 85.

As shown in FIGS. 2 and 3, the first gear 85 is driven in rotation by the left-right traveling drive motor 92 provided on the upper surface of the base frame 31. The first gear 85 meshes with the left-right traveling pinion 84, and then transmits a rotation driving force from the left-right traveling drive motor 92 to the left-right traveling pinion 84.

The left-right traveling drive motor 92 causes the left-right traveling pinion 84 to be rotated via the first gear 85. The left-right traveling pinion 84 to be rotated feeds the tooth of the left-right traveling rack 83 toward left and right. As a result, the left-right traveling base 35 (and thus the main frame 32) is moved to the left-right direction.

The elongated base 36 is arranged above the left-right traveling base 35. The base 36 is supported by the left-right traveling base 35 to be rotated around the rotational axis (first rotational axis) A1 extending in the vertical direction. As the left-right traveling base 35 moves in the left-right direction, the rotational axis A1 accordingly moves in the left-right direction. When the base 36 is not rotated around the rotational axis A1, a longitudinal direction of the base 36 coincides with the left-right direction. That is, when the base 36 is positioned to extend in the left-right direction, a rotation angle θV of the base 36 is 0°. In the following, a positional relationship between components will be described, on the basis of a state in which the rotation angle θV of the base 36 is 0°.

The base 36 is formed in a substantially U-shape with its upper side open, as viewed in the left-right direction. A rotary drive motor 93 and a worm gear mechanism 7 are provided on the upper surface of the base 36. The worm gear mechanism 7 includes a worm 86 and a worm wheel 87 meshing with the worm 86.

The worm 86 is supported to be rotated around an axis extending in a direction parallel to the longitudinal direction of the base 36. The worm 86 is driven in rotation by the rotary drive motor 93. Screw tooth for meshing with the tooth on an outer peripheral of the worm wheel 87 are formed on an outer peripheral surface of the worm 86.

The worm wheel 87 is supported on the upper surface of the base 36 to be rotated around the rotational axis A1. The worm wheel 87 is provided not to be rotated relative to the left-right traveling base 35.

The rotary drive motor 93 drives the worm 86 in rotation. The worm 86 to be rotated tries to feed the tooth of the worm wheel 87, but the worm wheel 87 cannot be rotated relative to the left-right traveling base 35. Therefore, along with rotation of the worm 86, the base 36 is rotated around the rotational axis A1 with respect to the worm wheel 87 and the left-right traveling base 35.

In the filament winding apparatus 100 of this example, the base 36 (main frame 32) can be rotated within a range of the angle ±100°. That is, the rotation angle θV that is an angle defined by the longitudinal direction and the left-right direction of the base 36, meets a condition of −100°≤θV≤100°. Accordingly, even when the core material 10 has a portion substantially parallel to the left-right direction, the winding unit 6 can be oriented along such portion.

The left arm 37 is formed in a substantially U-shape, as viewed in the vertical direction. The left arm 37 arranged at a left end of the base 36 is provided to protrude upward from the base 36. A left vertical rail 13 is provided on a right side surface of the left arm 37 to extend in the vertical direction. A left screw feeding shaft 14 is rotatably supported on the right side surface of the left arm 37 such that an axial direction of the left screw feeding shaft 14 is oriented to the vertical direction.

The right arm 38 is formed in a substantially U-shape, as viewed in the vertical direction. The right arm 38 arranged at a right end of the base 36 is provided to protrude upward from the base 36. A right vertical rail 16 is provided inside the right arm 38 to extend in the vertical direction. A right screw feeding shaft 17 is rotatably supported inside the right arm 38 such that an axial direction of the right screw feeding shaft 17 is oriented to the vertical direction.

As shown in FIG. 2, a right rotary drive gear 18 that drives the right screw feeding shaft 17 in rotation is mounted to a lower portion of the right screw feeding shaft 17 to not be rotated relative to the right screw feeding shaft 17. The right rotary drive gear 18 meshes with a lifting drive gear 19 (see FIG. 3) that is driven in rotation by the lifting motor 94. The right rotary drive gear 18 is driven in rotation along with rotation of the lifting drive gear 19.

As shown in FIG. 3, the lifting motor 94 is provided below the right arm 38. The lifting motor 94 drives the lifting drive gear 19 in rotation, the lifting drive gear 19 that meshes with the right rotary drive gear 18. As a result, the right screw feeding shaft 17 is rotated.

A toothed pulley (not shown) is mounted at a lower end of the left screw feeding shaft 14 and at a lower end of right screw feeding shaft 17 respectively to not be rotated relative to each other. Rotation of the right screw feeding shaft 17 is transmitted to the left screw feeding shaft 14 via transmission pulleys 21 provided in an upper portion of the base 36, and a toothed belt 22. Accordingly, due to driving of the lifting motor 94, the left screw feeding shaft 14 and the right screw feeding shaft 17 are simultaneously rotated around their respective shaft centers in the same orientation and at the same speed.

The lifting frame 33 is mounted to the left arm 37 and the right arm 38 to move in the vertical direction. The lifting frame 33 includes a left lifting base 41 and a right lifting base 42. The left lifting base 41 and the right lifting base 42 are moved up and down while always keeping the same height as each other.

As shown in FIG. 3, the left lifting base 41 is mounted to move up and down along the left vertical rail 13 provided in the left arm 37. The left lifting base 41 includes left screw coupling parts 43. The left lifting base 41 is screw-coupled to the left screw feeding shaft 14 via the left screw coupling parts 43. Accordingly, in conjunction with rotation of the left screw feeding shaft 14, the left lifting base 41 is moved in the vertical direction.

A left rotation arm supporter 44 is provided on a right side surface of the left lifting base 41. The left rotation arm supporter 44 supports a left rotation arm 61 in the winding unit 6 to be rotatable.

As shown in FIG. 2, the right lifting base 42 is mounted to move up and down along the right vertical rail 16 provided on the right arm 38. As shown in FIG. 3, the right lifting base 42 includes right screw coupling parts 45. The right lifting base 42 is screw-coupled to the right screw feeding shaft 17 via the right screw coupling parts 45.

Accordingly, in conjunction with rotation of the right screw feeding shaft 17, the right lifting base 42 is moved in the vertical direction.

A right rotation arm supporter 46 is provided on a left side surface of the right lifting base 42. The right rotation arm supporter 46 supports a right rotation arm 62 in the winding unit 6 to be rotatable.

The left rotation arm supporter 44 and the right rotation arm supporter 46 face each other in the left-right direction. The pitching axis A2 is arranged to pass through the right rotation arm supporter 46 and the left rotation arm supporter 44. The pitching axis A2 passes through respective centers of the left rotation arm supporter 44 and the right rotation arm supporter 46, as viewed in the left-right direction.

The right lifting base 42 supports a pitching drive motor 95 and an unit rotation worm 23.

The unit rotation worm 23 is rotatably supported by a shaft arranged coaxially with a rotational axis of the pitching drive motor 95. The unit rotation worm 23 is driven in rotation by the pitching drive motor 95. Screw tooth for meshing with tooth on an outer peripheral of a unit rotation worm wheel 24, are formed on an outer peripheral surface of the unit rotation worm 23.

The winding unit 6 is configured as a hoop winding unit 6x for hoop winding the fiber bundle F in FIG. 4 with respect to the core material 10. The hoop winding means a winding method in which the fiber bundle F is wound in a direction substantially perpendicular to an axial direction of the core material 10. The winding unit 6 has, as viewed in the front-rear direction, an opening portion (opening) 60, with its center in which the core material 10 passes through. The opening portion 60 is formed to penetrate the winding unit 6 in the front-rear direction.

As shown in FIGS. 2 to 4, the hoop winding unit 6x includes a winding unit frame (unit frame) 63, the hoop winding part 64, a hoop winding tightening part 65, and a winding drive part 66.

The winding unit frame 63 is made of a plate-like member. The winding unit frame 63 is formed in a U-shape with its front open, as viewed in the vertical direction. The winding unit frame 63 supports a circular rotary table 117 included in the winding drive part 66 to be rotated around a winding rotational axis (tightening part rotational axis) A3 extending in the front-rear direction. The winding unit frame 63 has, as viewed in the front-rear direction, a substantially circular opening 63a. The winding rotational axis A3 passes through a center of the opening 63a.

The left rotation arm 61 protruding outward is mounted on a left side surface of the winding unit frame 63. A right rotation arm 62 protruding outward is mounted on a right side surface of the winding unit frame 63.

The left rotation arm 61 and the right rotation arm 62 are provided symmetrically in a substantially center part in the vertical direction of the winding unit frame 63. The left rotation arm 61 is rotatably supported by the left rotation arm supporter 44. The right rotation arm 62 is rotatably supported by the right rotation arm supporter 46. That is, the winding unit 6 is supported to be rotated around the pitching axis A2 with respect to the lifting frame 33 via the left rotation arm 61 and the right rotation arm 62. Along with a vertical motion of the lifting frame 33, the pitching axis A2 is also moved up and down. A pitching angle θH of the winding unit frame 63 with an upright posture, is 0°. In the following, a positional relationship between components will be described as the basis of a state in which the pitching angle θH of the winding unit frame 63 is 0°.

The unit rotation worm wheel 24 is mounted to the right rotation arm 62 not to be rotated relative to each other. In a state in which the winding unit 6 is mounted to the lifting frame 33, the unit rotation worm wheel 24 meshes with the unit rotation worm 23 supported by the right lifting base 42.

The pitching drive motor 95 drives the unit rotation worm 23 in rotation. Since the unit rotation worm 23 to be rotated feeds the tooth of the unit rotation worm wheel 24, the unit rotation worm wheel 24 is rotated. Accordingly, the winding unit 6 turn up and down around the pitching axis A2.

In the filament winding apparatus 100 of this example, the winding unit 6 can turn up and down within a range of the angle ±100°. That is, if the pitching angle θH is 0°, the pitching angle θH in a state in which the winding unit frame 63 extends in the vertical direction as viewed in the left-right direction, such pitching angle θH meets a condition of $-100° \leq \theta H \leq 100°$. Accordingly, even when the core material 10 has a portion substantially parallel to the vertical direction, the winding unit 6 can be oriented along such portion.

The hoop winding part 64 is provided on a side opposite to the winding drive part 66, across the winding unit frame 63. As shown in FIG. 3, the hoop winding part 64 is arranged on a front surface of the winding unit frame 63. The hoop winding part 64 includes a rotating base 71, a plurality of bobbin supporters 72, a plurality of circumference guiding parts 73, a winding guiding part (fiber bundle guiding part) 74.

As shown in FIG. 3, the rotating base 71 made of two annular plates arranged in the front-rear direction, is mounted to the rotary table 117 to not be rotated relative to each other. One of two annular plates located on a side close to the rotary table 117 may be referred to as a first annular plate 71a, and the other annular plate located on a side far from the rotary table 117 may be referred to as a second annular plate 71b.

The first annular plate 71a and the second annular plate 71b are respectively supported by the rotary table 117. The rotary table 117, the first annular plate 71a and the second annular plate 71b are arranged side by side, in the order from the rear to the front. The rotary table 117, the first annular plate 71a and the second annular plate 71b are parallel to each other. Respective centers of the rotary table 117, the first annular plate 71a and the second annular plate 71b are located on the winding rotational axis A3.

The first annular plate 71a has the plurality of bobbin supporters 72 (four bobbin supporters 72, in this example). Each bobbin supporter 72 is arranged perpendicular to a front surface of the first annular plate 71a to extend in the front-rear direction. The plurality of bobbin supporters 72 is arranged side by side at equal intervals in a circumferential direction of the first annular plate 71a. Accordingly, the winding device 3 of this example can hoop winding the four fiber bundle F simultaneously onto the outer peripheral surface of the core material 10. The number of fiber bundle F may be changed if necessary.

In the following description, to identify each of the bobbin supporters 72, one of the bobbin supporters 72 drawn in the upper right portion in FIG. 4 may be referred to as a first bobbin supporter 72a. Other bobbin supporters 72 may be referred to as a second bobbin supporter 72b, a third bobbin supporter 72c, and a fourth bobbin supporter 72d in the clockwise order from the first bobbin supporter 72a in FIG. 4.

The second annular plate 71b has the plurality of circumference guiding parts 73 (eight circumference guiding parts 73, in this example). As shown in FIG. 3, each circumference guiding part 73 is arranged perpendicular to a front surface of the second annular plate 71b to extend in the front-rear direction. The plurality of circumference guiding parts 73 is arranged side by side at equal intervals in a circumferential direction of the second annular plate 71b.

To identify each of the circumference guiding parts 73, the lower circumference guiding part 73 that is one of the two circumference guiding parts 73 drawn in the rightmost in FIG. 4, may be referred to as a first circumference guiding part 73a. Other circumference guiding parts 73 may be referred to as a second circumference guiding part 73b, a third circumference guiding part 73c, a fourth circumference guiding part 73d, a fifth circumference guiding part 73e, a sixth circumference guiding part 73f, a seventh circumference guiding part 73g, and an eighth circumference guiding part 73h, in the clockwise order from the first circumference guiding part 73a in FIG. 4.

Each of the first circumference guiding part 73a and the second circumference guiding part 73b is configured as one single roller, for example. The first circumference guiding part 73a and the second circumference guiding part 73b guide the fiber bundle F (a thick dotted line in FIG. 4) fed from a bobbin which is supported by the first bobbin supporter 72a.

Each of the third circumference guiding part 73c and the fourth circumference guiding part 73d is configured as a multiple-roller in which two rollers are arranged in the front-rear direction. The third circumference guiding part 73c and the fourth circumference guiding part 73d can guide two fiber bundles F side by side in the front-rear direction without crossing each other. The third circumference guiding part 73c and the fourth circumference guiding part 73d guide the fiber bundles F (a thick dotted line and a thin solid line in FIG. 4) fed from bobbins which are supported by the first bobbin supporter 72a and the second bobbin supporter 72b.

Each of the fifth circumference guiding part 73e and the sixth circumference guiding part 73f is configured as a multiple-roller in which three rollers are arranged in the front-rear direction. The fifth circumference guiding part 73e and the sixth circumference guiding part 73f can guide three fiber bundles F side by side in the front-rear direction without crossing thereamong. The fifth circumference guiding part 73e and the sixth circumference guiding part 73f guide the fiber bundles F (a thick dotted line, a thin solid line and a thin dotted line in FIG. 4) fed from bobbins supported by the first bobbin supporter 72a, the second bobbin supporter 72b and the third bobbin supporter 72c.

Each of the seventh circumference guiding part 73g and the eighth circumference guiding part 73h is configured as a multiple-roller in which four rollers are arranged in the front-rear direction. The seventh circumference guiding part 73g and the eighth circumference guiding part 73h can guide four fiber bundles F side by side in the front-rear direction without crossing thereamong. The seventh circumference guiding part 73g and the eighth circumference guiding part 73h guide the fiber bundles F (a thick dotted line, a thin solid line, a thin dotted line and a thin chain line in FIG. 4) fed from bobbins which are supported by the first bobbin supporter 72a, the second bobbin supporter 72b, the third bobbin supporter 72c, and the forth bobbin supporter 72d.

As shown in FIG. 3, the winding guiding part 74 protrudes forward from the rotary table 117. The winding guiding part 74 is supported by the rotary table 117 and the first annular plate 71a. The winding guiding part 74 is provided slightly outside in a radial direction of the rotary table 117 and the first annular plate 71a. The winding guiding part 74 is rotated around the winding rotational axis A3 along with rotation of the rotary table 117 and the first annular plate 71a.

The winding guiding part 74 has a plurality of (three, in this example) tension bars 74a and a ring guide 74b. Each tension bar 74a applies tension to the corresponding fiber bundle F by rubbing between each tension bar 74a and the corresponding wound fiber bundle F. As shown in FIG. 4, such fiber bundle F is wound around each tension bar 74a in order, and then wound onto the outer peripheral surface of the core material 10 via the ring guide 74b.

As shown in FIG. 4, the fiber bundle F (the thick dotted line in FIG. 4) fed from the bobbin that is supported by the first bobbin supporter 72a is wound around all of the circumference guiding parts 73, in the order of the first circumference guiding part 73a to the eighth circumference guiding part 73h, and then guided to the winding guiding part 74.

The fiber bundle F (the thin solid line in FIG. 4) fed from the bobbin that is supported by the second bobbin supporter 72b is wound around six of the circumference guiding parts 73, in the order of the third circumference guiding part 73c to the eighth circumference guiding part 73h, and then guided to the winding guiding part 74.

The fiber bundle F (the thin dotted line in FIG. 4) fed from the bobbin that is supported by the third bobbin supporter 72c is wound around four of the circumference guiding parts 73, in the order of the fifth circumference guiding part 73e, the sixth circumference guiding part 73f, the seventh circumference guiding part 73g, and the eighth circumference guiding part 73h, and then guided to the winding guiding part 74.

The fiber bundle F (the thin chain line of FIG. 4) fed from the bobbin that is supported by the forth bobbin supporter 72d is wound around two of the circumference guiding parts 73, in the order of the seventh circumference guiding part 73g and the eighth circumference guiding part 73h, and then guided to the winding guiding part 74.

As shown in FIG. 3, the hoop winding tightening part 65 is supported by the rotary table 117 to protrude forward of the hoop winding part 64. The hoop winding tightening part 65 and the hoop winding part 64 are arranged side by side in the front-rear direction. The hoop winding tightening part 65 winds a tape T onto the outer peripheral surface of the core material 10 that is hoop-wound by the hoop winding part 64. The tape T may be, for example, a heat-shrinkable tape or a tape impregnated with an uncured thermosetting resin which will be changed to liquid.

The hoop winding tightening part 65 is provided at a position away from the winding rotational axis A3 (slightly outside in the radial direction of the rotary table 117), as viewed in the front-rear direction. The hoop winding tightening part 65 is rotated around the winding rotational axis A3 along with rotation of the rotary table 117. As shown in FIG. 3, the hoop winding tightening part 65 includes a base plate 101, a tightening tape bobbin 102, a first guide roller 103 and a second guide roller 104.

The base plate 101 is made of a plate-like member. The base plate 101 supports the tightening tape bobbin 102, the first guide roller 103 and the second guide roller 104 such that they protrude forward.

The tape T for winding and tightening is wound onto the tightening tape bobbin 102. The tape T drawn from the tightening tape bobbin 102 is wound around the first guide roller 103 and the second guide roller 104 in order, and then the fiber bundle F is wound onto the outer peripheral surface of the hoop-wound core material 10.

As shown in FIG. 2 and the like, the winding drive part 66 includes the winding drive motor 111, a first transmission pulley 112, a transmission belt 113, a second transmission pulley 114, a transmission gear 115, a rotary gear 116, and the rotary table 117.

The winding drive motor 111 is provided upward of and on a left side of the winding unit frame 63. The first transmission pulley 112 is mounted to an output shaft of the winding drive motor 111 to not be rotated relative to each other.

The transmission belt 113 is wound around the first transmission pulley 112 and the second transmission pulley 114, and transmits rotation of the first transmission pulley 112 to the second transmission pulley 114. As shown in FIG. 2, a tension roller 118 applying tension to the transmission belt 113 may be provided in the vicinity of an intermediate portion of the transmission belt 113 in the vertical direction.

The second transmission pulley 114 and the transmission gear 115 are rotatably supported by the winding unit frame 63 on a lower left side of the winding unit frame 63. The second transmission pulley 114 and the transmission gear 115 arranged side by side in the front-rear direction are provided to not be rotated relative to each other.

The rotary gear 116 is provided at a center of the winding unit frame 63, as viewed in the front-rear direction. That is, a center of the rotary gear 116 is positioned on the winding rotational axis A3. The rotary gear 116 meshes with the transmission gear 115. The rotary gear 116 having an annular shape is supported by the rotary table 117 to not be rotated relative to each other.

The rotary table 117 made of an annular plate is arranged coaxially with the rotary gear 116. The rotary table 117 is arranged forward of the rotary gear 116. The rotary table 117 is rotatably supported by the winding unit frame 63.

A driving force of the winding drive motor 111 is transmitted to the rotary gear 116 and the rotary table 117 via the first transmission pulley 112, the transmission belt 113, the second transmission pulley 114, and the transmission gear 115. Rotation of the rotary table 117 allows the hoop winding part 64 and the hoop winding tightening part 65 which are supported by the rotary table 117 to be rotated around the winding rotational axis A3.

Accordingly, the fiber bundle F guided by the winding guiding part 74 and the tape T guided by the second guide roller 104 are wound onto the outer peripheral surface of the core material 10. The hoop winding tightening part 65 is provided at a position displaced from the hoop winding part 64 in the front-rear direction. Therefore, after the fiber bundle F is wound around the core material 10, the tape T is then wound onto the outer peripheral surface of the core material 10.

Figure 5:
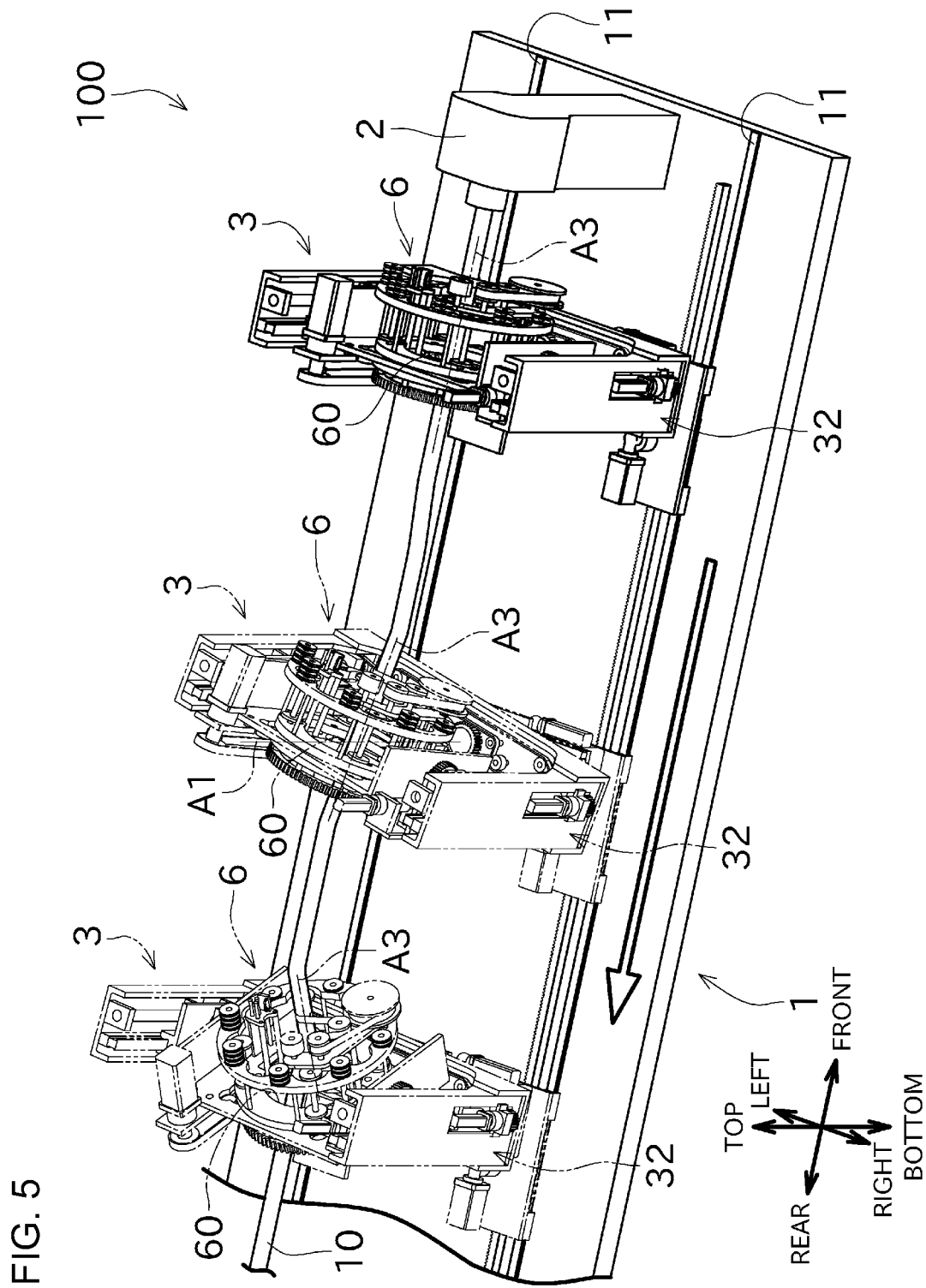
FIG. 5 is a perspective view showing a situation in which a posture of the winding unit changes in accordance with a shape of a core material in a process of winding a fiber bundle around the core material.

In this example, the winding device 3 travels along the core material 10 such that the hoop winding part 64 precedes the hoop winding tightening part 65 in a traveling direction of the winding device 3. Accordingly, with one traveling of the winding device 3, the fiber bundle F and the tape T can be wound onto the outer peripheral surface of the core material 10. FIG. 5 shows an example in which the fiber bundle F and the tape T are wound onto the outer peripheral surface of the core material 10 with one traveling of the winding device 3 rearward. However, in a first traveling, the fiber bundle F may be first wound onto the outer peripheral surface of the core material 10 by the hoop winding part 64. In a second traveling, the tape T may be then wound onto the outer peripheral surface in which the fiber bundle F has already wound in the first traveling, by the hoop winding tightening part 65. The traveling direction of the winding device 3 may be reversed between the first traveling and the second traveling.

The drive motors (specifically, the front-rear traveling drive motor 91, the left-right traveling drive motor 92, the rotary drive motor 93, the lifting motor 94, and the pitching drive motor 95) included in the winding device 3 are controlled by the control device 5 in FIG. 1. For such control, for example, as shown in FIG. 1, a position of the winding unit 6 can be described to define an XYZ rectangular coordinate system with an X-axis that is a left-right axis, a Y-axis that is an up-down axis, and a Z-axis that is a front-rear axis.

Accordingly, as shown in FIG. 5, the winding device 3 travels along the rails 11 while adjusting the position and the posture of the winding unit 6 such that the center of the opening 60 of the winding unit 6 always coincides with the center of the core material 10. That is, the winding rotational axis A3 of the winding unit 6 always coincides with the axial direction of the core material 10. Accordingly, even in the core material 10 having a curved shape, the fiber bundle F can be wound onto the outer peripheral surface of the core material 10 according to its shape.

In this example, the fiber bundle F can be wound around the core material 10 which has originally curved, according to such curved shape. Therefore, it is superior in that winding of the fiber bundle F is not disordered, as compared with a configuration in which a linear core material around which the fiber bundle has already wound is curved.

The winding unit 6 may be configured as a helical winding unit 6y for helical winding shown in FIG. 6. The helical winding means a winding method for winding the fiber bundle F in a direction tilted by a predetermined angle from the axial direction of the core material 10.

Figure 7:
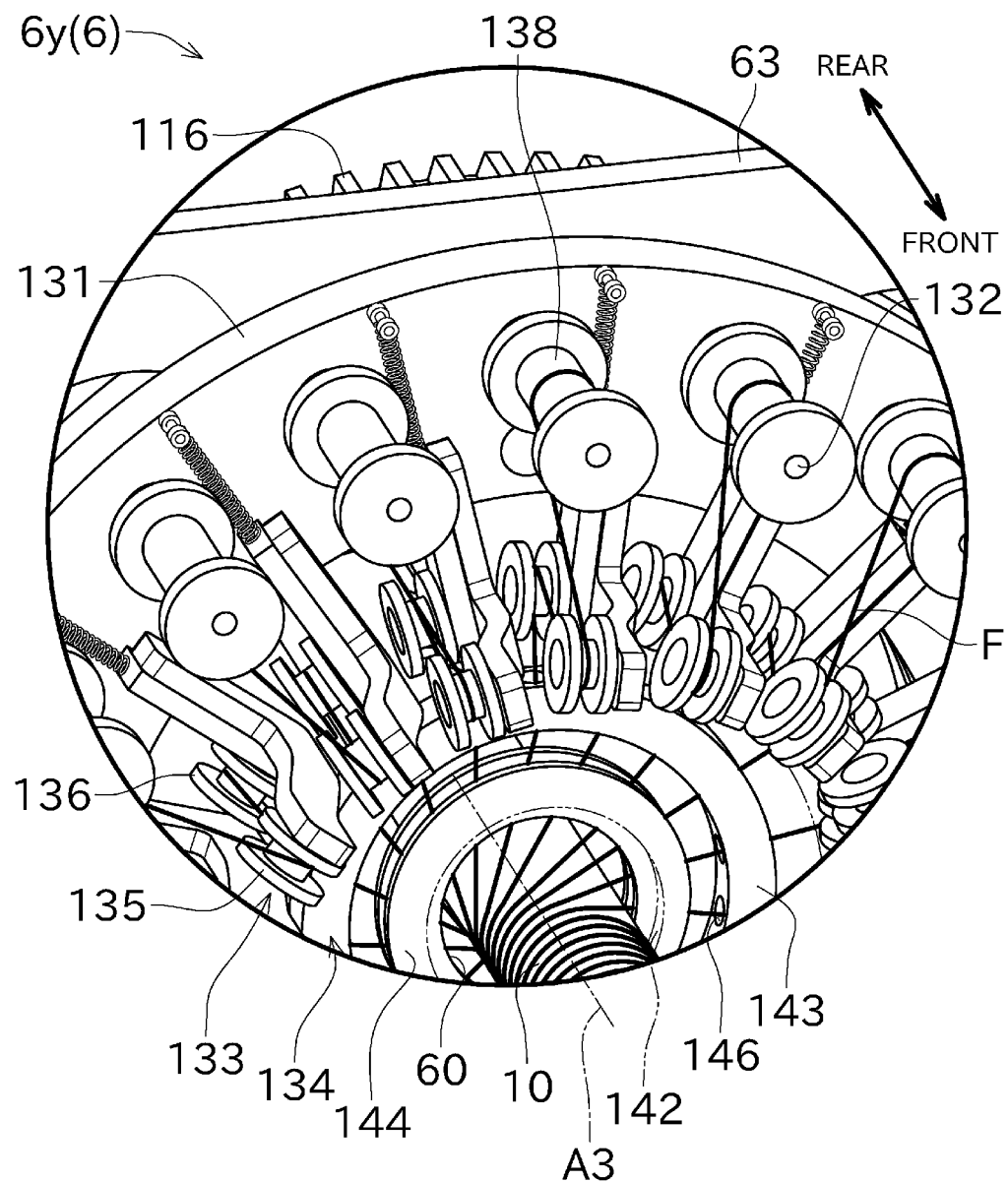
FIG. 7 is a partial enlarged view showing a configuration of the helical winding unit.
Figure 8:
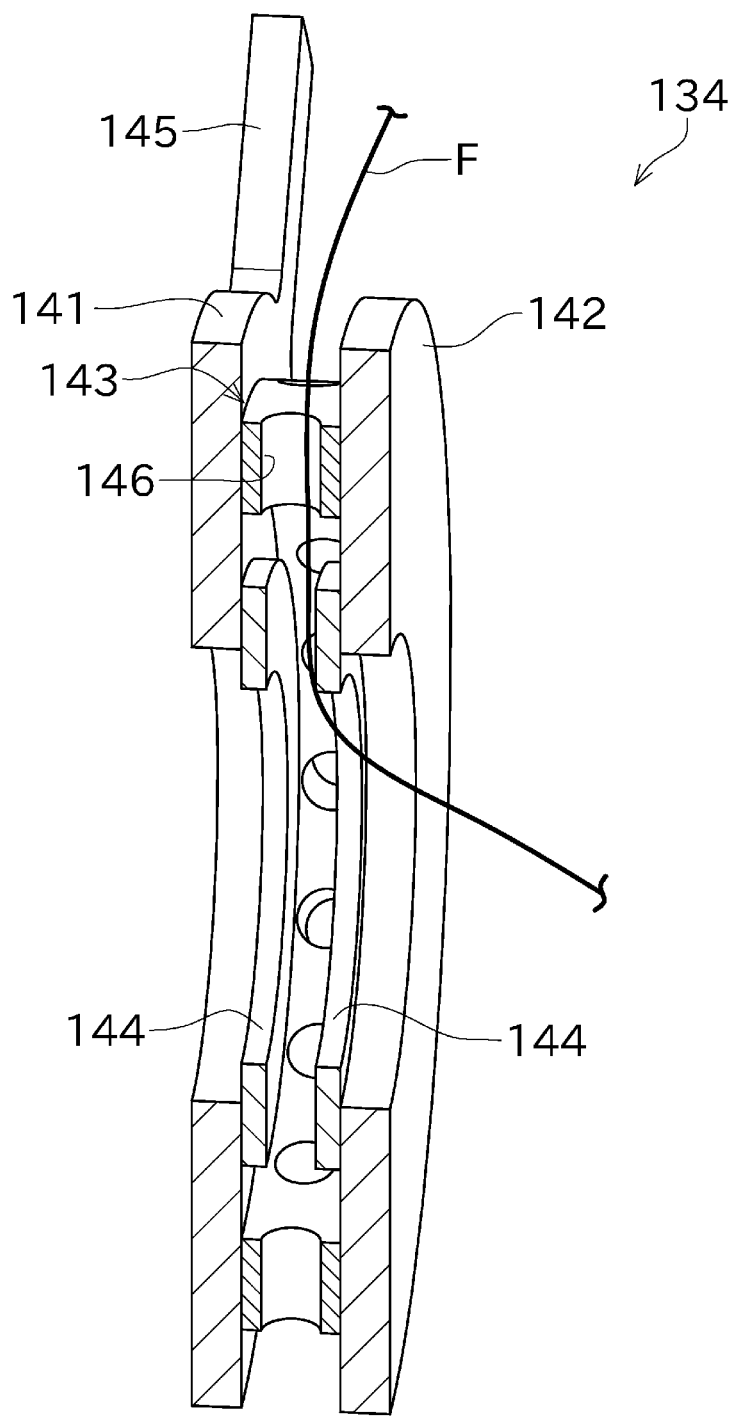
FIG. 8 is a cross-sectional perspective view showing a configuration of a central guiding part in the helical winding unit.

FIG. 6 is a perspective view showing a configuration of the helical winding unit 6y. FIG. 7 is a partial enlarged view showing a configuration of the helical winding unit 6y. FIG. 8 is a cross-sectional perspective view showing a configuration of a central guiding part 134 of the helical winding unit 6y. In the following description of the helical winding unit 6y, members identical or similar to those of the above-described example may not be described and instead the same reference signs as in the above-described example are given on the drawings.

As shown in FIG. 6, the helical winding unit 6y includes a helical winding part 130 instead of the hoop winding part 64 and the hoop winding tightening part 65. The helical winding part 130 includes a base circular plate 131, a plurality of bobbin mounting parts 132, a plurality of helical winding circumference guiding parts 133, and a central guiding part 134. The helical winding circumference guiding parts 133 and the central guiding part 134 form a fiber bundle guide section for guiding the plural fiber bundles F simultaneously.

The base circular plate 131 having an annular shape, its center position coincides with the center of the opening 60 in the helical winding unit 6y. The base circular plate 131 is provided on a side opposite to the winding drive part 66 in the front-rear direction, across the winding unit frame 63. The base circular plate 131 that is mounted to the rotary table 117 in the winding drive part 66, is rotated in conjunction with rotation of the rotary table 117.

The bobbin mounting parts 132 are provided perpendicular to a front surface of the base circular plate 131 to protrude forward from the base circular plate 131. A target bobbin 138 around which the fiber bundle F is wound is mounted to the corresponding bobbin mounting part 132.

The plurality of bobbin mounting parts 132 is arranged side by side at equal intervals in a circumferential direction of the base circular plate 131. Each helical winding circumference guiding part 133 is provided in the vicinity of the corresponding bobbin mounting part 132. Each helical winding circumference guiding part 133 is arranged side by side at equal intervals in the circumferential direction of the base circular plate 131.

Each helical winding circumference guiding part 133 includes one by one, first intermediate rollers 135 and second intermediate rollers 136 arranged in the front-rear direction. As shown in FIG. 7, each first intermediate roller 135 is provided at a position farther from the base circular plate 131 than the corresponding second intermediate roller 136. In other words, each first intermediate roller 135 is provided forward of the corresponding second intermediate roller 136.

Each second intermediate roller 136 is mounted to the base circular plate 131 to slide in a radial direction. Each second intermediate roller 136 is biased in an orientation of moving outward in the radial direction of the base circular plate 131, by an appropriate biasing member (specifically, a spring).

As shown in FIGS. 6 and 7, the fiber bundle F from the target bobbin 138 that is mounted to the target bobbin mounting part 132 is wound around the corresponding first intermediate roller 135 and the corresponding second intermediate roller 136 in order, and then guided to the central guiding part 134. The tension applied to the fiber bundle F is appropriately adjusted by spring force in which the biasing member exerts on the target second intermediate roller 136. As such, each second intermediate roller 136 functions as a tension roller.

The central guiding part 134 having a substantially cylindrical shape, is provided at the center of the helical winding part 130 such that an axial direction of the central guiding part 134 coincides with the winding rotational axis A3. An annular guiding part 143 is formed smaller than an annular area where each first intermediate roller 135 and each second intermediate roller 136 are arranged side by side.

In other words, the annular guiding part 143 is provided at a position closer to a center than each first intermediate roller 135 and each second intermediate roller 136, as viewed in the front-rear direction. The fiber bundle F guided by the target second intermediate roller 136 is guided from an outside in the radial direction of the central guiding part 134 to the core material 10 passing through an inside of the central guiding part 134, as shown in FIG. 6 and FIG. 7.

As shown in FIG. 8, the central guiding part 134 includes a first annular plate 141, a second annular plate 142, an annular guiding part 143, and auxiliary guiding parts 144. All of the first annular plate 141, the second annular plate 142, the annular guiding part 143, and the auxiliary guiding parts 144 are respectively formed in an annular shape and arranged such that their central axes coincide therewith.

The first annular plate 141 has a mounting part 145 extending in a radial direction. Although the base circular plate 131 is not shown in FIG. 8, the first annular plate 141 is mounted to the base circular plate 131 via the mounting part 145. Accordingly, the first annular plate 141 is rotated in conjunction with rotation of the base circular plate 131. The first annular plate 141 is connected to the annular guiding part 143 on one side in the front-rear direction.

The second annular plate 142 has an annular shape as with the first annular plate 141. The second annular plate 142 is connected to the annular guiding part 143 on a side opposite to the first annular plate 141 in the front-rear direction.

The annular guiding part 143 having an annular shape, has a predetermined thickness in an axial direction. An outer diameter of the annular guiding part 143 is smaller than that of the first annular plate 141 and the second annular plate 142. An inner diameter of the annular guiding part 143 is larger than that of the first annular plate 141 and the second annular plate 142.

The annular guiding part 143 has fiber bundle guide holes 146 that penetrate the annular guiding part 143 in the radial direction. The plurality of fiber bundle guide holes 146 is formed side by side at equal intervals in a circumferential direction of the annular guiding part 143, in accordance with the number of bobbin mounting parts 132 (in other words, the number of helical winding circumference guiding parts 133). Each fiber bundle guide hole 146 guides the fiber bundle F guided from the corresponding second intermediate roller 136 to the center side of the central guiding part 134.

Each of the auxiliary guiding parts 144 is made of two plates having an annular shape. As shown in FIG. 8, an outer diameter of each auxiliary guiding part 144 is larger than an inner diameter of the first annular plate 141 and the second annular plate 142, and smaller than an inner diameter of the annular guiding part 143. The inner diameter of each auxiliary guiding part 144 is smaller than that of the first annular plate 141 and the second annular plate 142.

The two plates as each auxiliary guiding part 144 are respectively connected to a front surface of the first annular plate 141 and a rear surface of the second annular plate 142. The auxiliary guiding parts 144 are provided coaxially with the first annular plate 141 and the second annular plate 142.

With this configuration, as shown in FIG. 8, an inner peripheral surface of each auxiliary guiding part 144 is closer to an axis of the central guiding part 134 than the inner peripheral surface of the first annular plate 141 and the second annular plate 142. That is, the fiber bundle F guided by each auxiliary guiding part 144 can be guided to a position closer to the core material 10 passing through the center of the central guiding part 134, via the auxiliary guiding parts 144. This can further stabilize behaviors of the fiber bundle F to be wound around the core material 10.

The helical winding part 130 with the above-described configuration can guide the plurality of fiber bundles F radially to the core material 10. The helical winding part 130 is rotated along with rotation of the rotary table 117, and thereby the plurality of fiber bundles F can be simultaneously wound around the core material 10.

The winding unit 6 may be configured as a 0° winding unit 6z for 0° winding shown in FIG. 9. The 0° winding means an arranging method in which the fiber bundle F is arranged onto the outer peripheral surface of the core material 10 in a direction in parallel with an axial direction of the core material 10. Although the fiber bundle F does not circulate around the core material, this arrangement of the fiber bundle F can also be considered to be included in the "winding."

Figure 10:
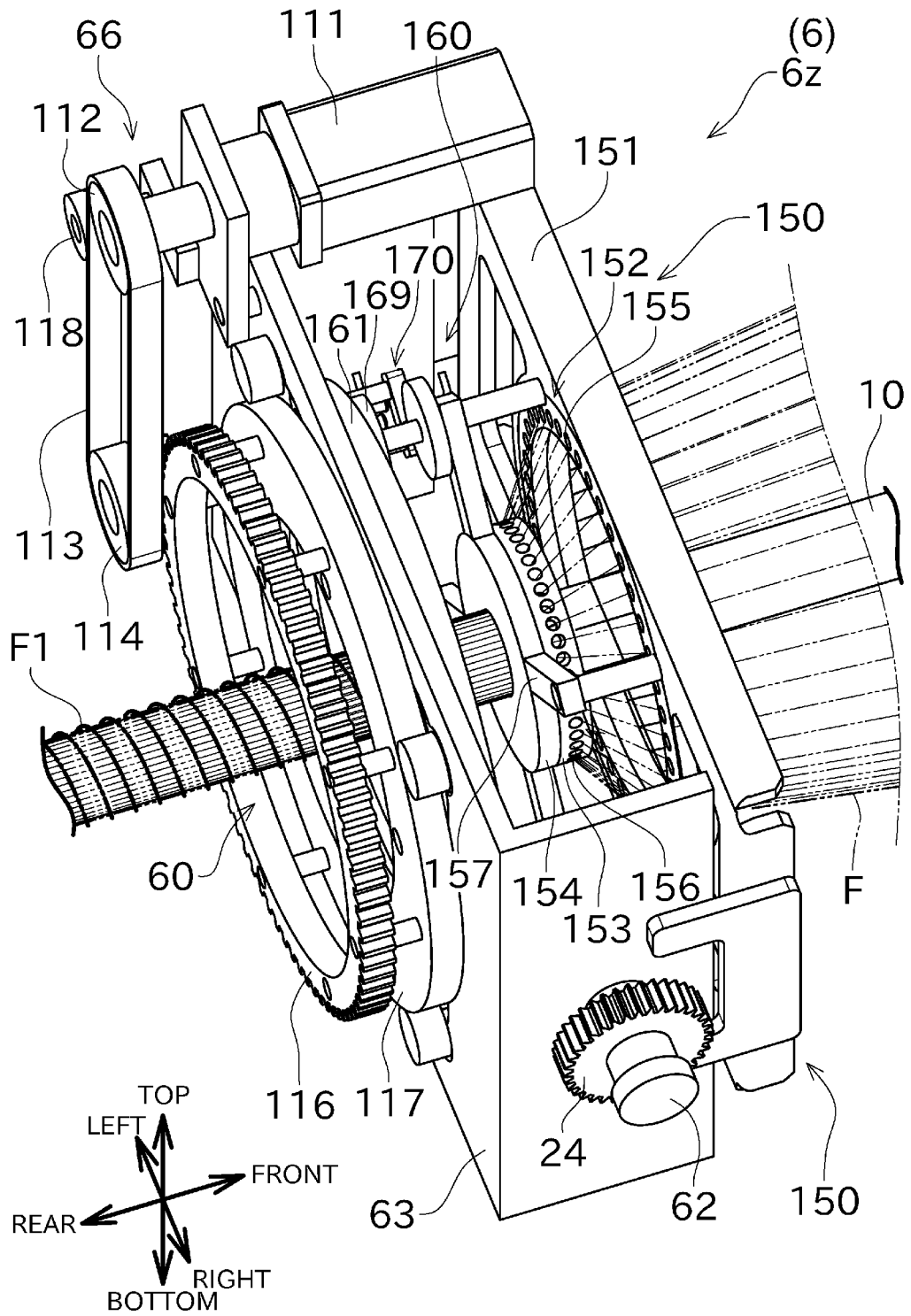
FIG. 10 is a perspective view showing the configuration of the 0° winding unit.
Figure 11:
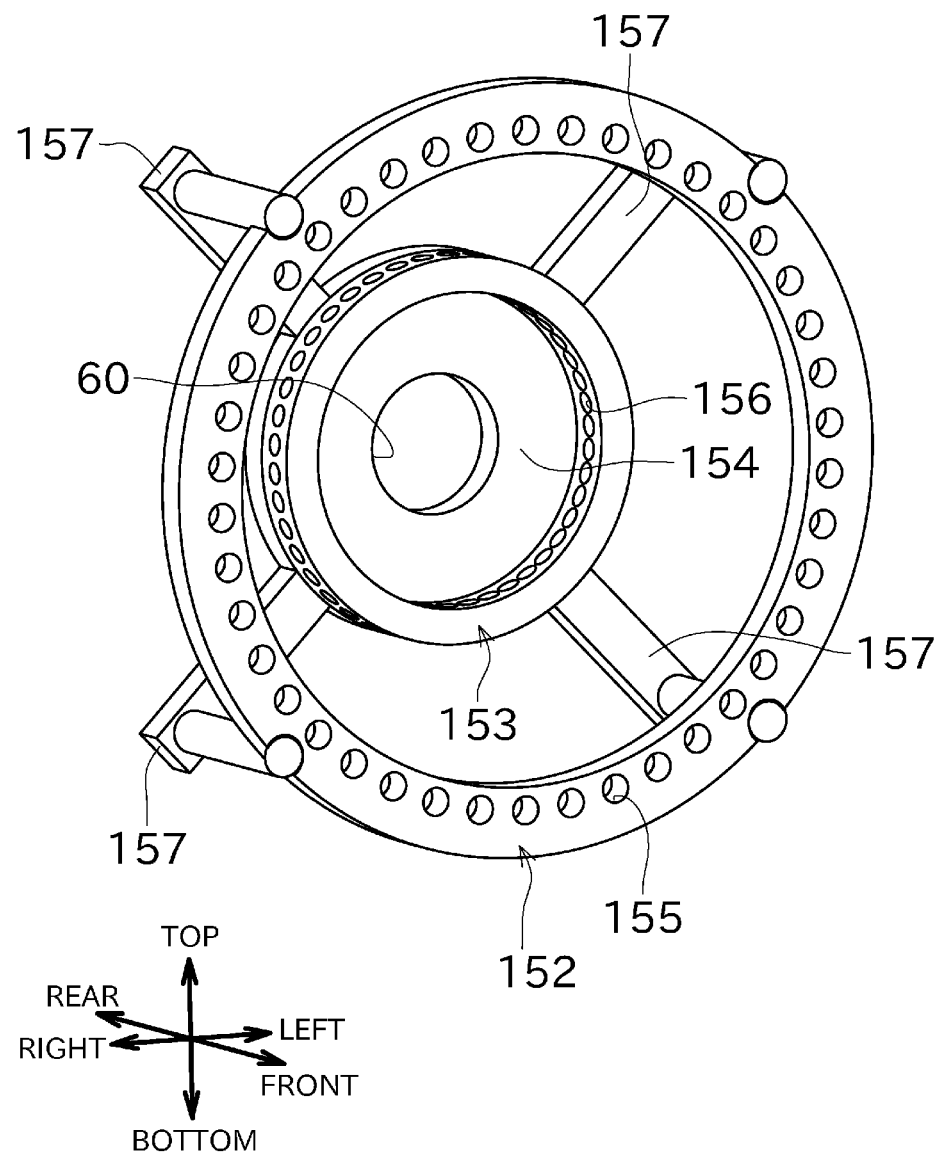
FIG. 11 is a perspective view showing a configuration of a fiber guiding part of the 0° winding unit.
Figure 13:
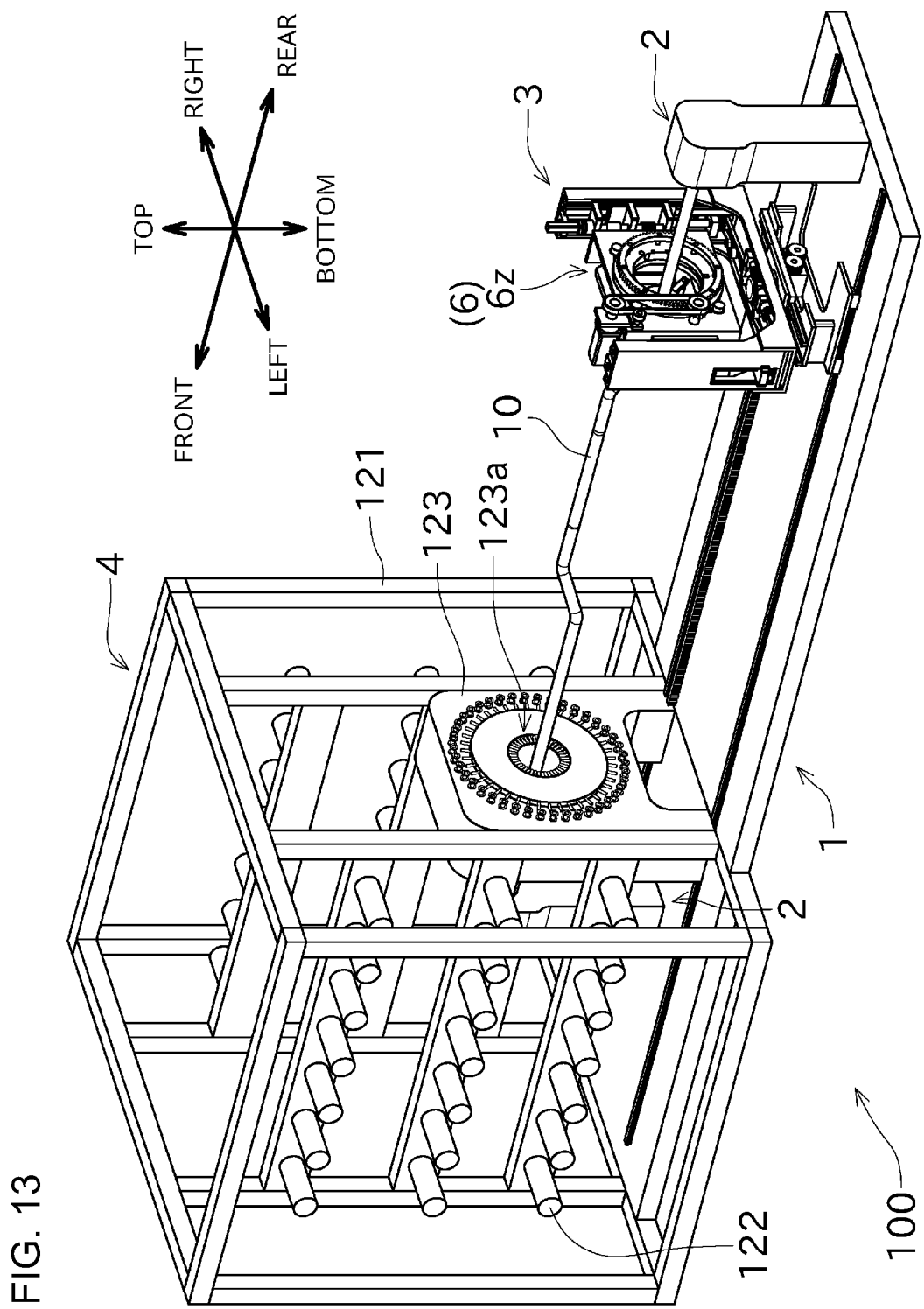
FIG. 13 is a perspective view showing a configuration of a filament winding apparatus including a creel stand.

The 0° winding unit 6z will be described in detail. FIGS. 9 and 10 are perspective views showing a configuration of the 0° winding unit 6z. FIG. 11 is a perspective view showing a configuration of a fiber guiding part of the 0° winding unit 6z. FIG. 12 is a perspective view showing a configuration of a 0° winding tightening part 160. FIG. 13 is a perspective view showing the filament winding apparatus 100 including a creel stand 4. In the 0° winding unit 6z, members identical or similar to those of the above-described hoop winding unit 6x may not be described and instead the same reference signs as in the above-described configurations are given on the drawings.

As shown in FIGS. 9 and 10, the 0° winding unit 6z includes a fixed fiber bundle guiding part 150 and the 0° winding tightening part (tightening part) 160 instead of the hoop winding part 64 and the hoop winding tightening part 65. The fixed fiber bundle guiding part 150 and the 0° winding tightening part 160 are arranged side by side in the front-rear direction.

The fixed fiber bundle guiding part 150 is fixed to the winding unit frame 63. The fixed fiber bundle guiding part 150 guides the plurality of fiber bundles F to the outer peripheral surface of the core material 10 to be arranged at an appropriate interval in the circumferential direction of the core material 10. Unlike the hoop winding part 64 or the like of the hoop winding unit 6x described above, even though the rotary table 117 in FIG. 10 is rotated, the fixed fiber bundle guiding part 150 is not rotated. Each of the plurality of fiber bundles F is arranged on the outer peripheral surface of the core material 10 in a direction parallel to the axial direction of the core material 10.

As shown in FIGS. 9 and 10, the fixed fiber bundle guiding part 150 includes a mounting frame 151, a first circular guiding part 152, a second circular guiding part 153, a third circular guiding part 154.

The mounting frame 151 is made of a plate-shaped member. The mounting frame 151 is mounted on the front side of the winding unit frame 63, with its thickness direction facing in the front-rear direction. The first circular guiding part 152 is fixed at the center of the mounting frame 151. The mounting frame 151 and the first circular guiding part 152 may be integrally formed.

The first circular guiding part 152 is formed in a substantially annular shape having a circular opening through which the core material 10 can pass. The first circular guiding part 152 is arranged on the front side of the mounting frame 151 (in other words, the upstream side with respect to the direction of traveling of the fiber bundles F). The first circular guiding part 152 is provided on the mounting frame 151 such that an axial direction of the first circular guiding part 152 is oriented to the front-rear direction.

A plurality of front guiding holes 155 are formed in the first circular guiding part 152 to penetrate the first circular guiding part 152 in the front-rear direction (thickness direction). The front guiding holes 155 are arranged side by side at equal intervals in the circumferential direction of the first circular guiding part 152. The fiber bundle F passes through the respective front guiding holes 155.

The second circular guiding part 153 is made of an annular plate having a predetermined thickness in an axial direction. The second circular guiding part 153 is arranged on the rear side of the first circular guiding part 152 with a predetermined distance in the front-rear direction with respect to the first circular guiding part 152. The second circular guiding part 153 is arranged coaxially with the first circular guiding part 152.

An outer diameter of the second circular guiding part 153 is smaller than an inner diameter of the first circular guiding part 152. The second circular guiding part 153 is fixed on a front surface of the third circular guiding part 154.

A plurality of rear guiding holes 156 are formed in the second circular guiding part 153 to penetrate the second circular guiding part 153 in a radial direction. The rear guiding holes 156 are arranged in correspondence with the number of front guiding holes 155. The rear guiding holes 156 are arranged side by side at equal intervals in the circumferential direction of the second circular guiding part 153. The fiber bundle F passes through the respective rear guiding holes 156. Each of the rear guiding holes 156 guides the fiber bundle F guided from each of the front guiding holes 155 to the center side of the second circular guiding part 153.

As shown in FIG. 11, the third circular guiding part 154 is made of an annular plate. A plurality of support plates 157 (four support plates 157, in this example) are fixed on the third circular guiding part 154. Each of support plates 157 extends outward in the radial direction of the third circular guiding part 154. The third circular guiding part 154 is mounted to the mounting frame 151 via the support plates 157. The third circular guiding part 154 is connected to the rear surface of the second circular guiding part 153. The third circular guiding part 154 supports the second circular guiding part 153 to be arranged coaxially with the first circular guiding part 152.

The third circular guiding part 154 is formed to have substantially the same size as the second circular guiding part 153. An inner diameter of the third circular guiding part 154 is smaller than an inner diameter of the second circular guiding part 153 and slightly larger than an outer diameter of the core material 10. Accordingly, a circular gap through which the fiber bundle F passes is formed between an inner peripheral surface of the third circular guiding part 154 and the core material 10 penetrating the third circular guiding part 154.

In the fixed fiber bundle guiding part 150 configured as described above, the plurality of fiber bundles F from a later-described creel stand 4 shown in FIG. 13 passes respectively the front guiding holes 155 which are formed in the first circular guiding part 152, as shown in FIGS. 9 and 10. Accordingly, the fiber bundles F are aligned to be arranged side by side in a circumferential direction of the first circular guiding part 152.

Thereafter, each of fiber bundles F passes the rear guiding hole 156 of the second circular guiding part 153. The rear guiding holes 156 are formed corresponding to the front guiding holes 155. Accordingly, the fiber bundles F are guided to approach the outer periphery of the core material 10, while keeping the state in which the fiber bundles F are arranged in a circular manner. That is, the plurality of fiber bundles F that have passed through the second circular guiding part 153 are arranged in a small circular manner.

Thereafter, the plurality of fiber bundles F pass through the circular gap between the third circular guiding part 154 and the core material 10. As a result, the fiber bundles F are aligned preferably along the axial direction of the core material 10.

The 0° winding tightening part 160 is provided rearward of the fixed fiber bundle guiding part 150. The 0° winding tightening part 160 is arranged side by side in the front-rear direction with the fixed fiber bundle guiding part 150. The 0° winding tightening part 160 tightens the fiber bundles F which are guided by the fixed fiber bundle guiding part 150 and arranged on the outer peripheral surface of the core material 10, by winding a tightening fiber bundle (tightening material) F1.

The 0° winding tightening part 160 is arranged forward of the winding unit frame 63 (the side opposite to the winding drive part 66 across the winding unit frame 63). As shown in FIG. 12, the 0° winding tightening part 160 includes a rotary plate 161, a tightening fiber bobbin supporting part (bobbin supporting part) 162, and a tightening fiber guiding part (tightening material guiding part) 170.

The rotary plate 161 made of an annular plate is provided rearward of the third circular guiding part 154. The rotary plate 161 is arranged coaxially with the rotary table 117, the third circular guiding part 154, the second circular guiding part 153, and the first circular guiding part 152.

The rotary plate 161 is arranged at the side opposite to the rotary table 117 across the winding unit frame 63. The rotary plate 161 is mounted to the rotary table 117 to not be rotated relative to each other. The rotary plate 161 is rotated around the winding rotational axis A3 in FIG. 12 along with rotation of the rotary table 117.

As shown in FIG. 12, the tightening fiber bobbin supporting part 162 is provided at an appropriate position in the circumferential direction of the rotary plate 161. The tightening fiber bobbin supporting part 162 is provided perpendicular to a front surface of the rotary plate 161 to protrude forward from the front surface of the rotary plate 161. The tightening fiber bobbin supporting part 162 supports a tightening fiber bobbin (tightening material bobbin) 169. A tightening fiber bundle F1 is wound onto the tightening fiber bobbin 169.

The tightening fiber guiding part 170 is arranged forward of the rotary plate 161. The tightening fiber guiding part 170 is supported by the rotary plate 161. The tightening fiber guiding part 170 is provided at the position apart from the winding rotational axis A3. The tightening fiber guiding part 170 is rotated around the winding rotational axis A3 along with rotation of the rotary plate 161.

The tightening fiber guiding part 170 guides the tightening fiber bundle F1 drawn from the tightening fiber bobbin 169 toward the outer peripheral surface of the core material 10. The tightening fiber guiding part 170 includes a first fiber guiding part 163 and a second fiber guiding part 164.

The first fiber guiding part 163 is made of a plurality of tension bars (three tension bars, in this example). The tension bar applies tension to the tightening fiber bundle F1 by rubbing between the tension bar and wound the tightening fiber bundle F1. The tightening fiber bundle F1 is wound around each tension bar in order, and then guided to the second fiber guiding part 164.

The second fiber guiding part 164 is made of, for example, an elongated plate-shaped member. As shown in FIG. 12, one end of the second fiber guiding part 164 is fixed on the front surface of the rotary plate 161, and the other end thereof is provided at a position near the center (the core material 10) of the rotary plate 161. Accordingly, the second fiber guiding part 164 extends inside in a radial direction from the rotary plate 161.

In the second fiber guiding part 164, a tightening fiber bundle guide hole 165 is formed through in an end on a side close to the center of the rotary plate 161. The tightening fiber bundle guide hole 165 penetrates the second fiber guiding part 164 in a direction which is perpendicular to the axis of the rotary plate 161 and is perpendicular to the radial direction of the rotary plate 161. The tightening fiber bundle F1 passes the tightening fiber bundle guide hole 165 and is guided to a position near the outer peripheral surface of the core material 10.

As the rotary plate 161 rotates, the tightening fiber bobbin supporting part 162 (and thus the tightening fiber bobbin 169), the first fiber guiding part 163 and the second fiber guiding part 164 rotate around the winding rotational axis A3 (that is, the core material 10). As a result, the tightening fiber bundle F1 is wound in a direction tilted by a predetermined angle from the axial direction of the core material 10. The plurality of fiber bundle F aligned on the outer peripheral surface of the core material 10 along the axial direction thereof are fixed on the outer peripheral surface of the core material by the tightening fiber bundle F1, as shown in FIG. 10.

As shown in FIG. 13, the filament winding apparatus 100 which uses the 0° winding unit 6z, includes a creel stand 4. The creel stand 4 can support a plurality of bobbins.

The creel stand 4 is used to supply the plurality of fiber bundle F to the 0° winding unit 6z. The creel stand 4 includes a support frame 121, a plurality of bobbin supporting parts 122, and an aligning guide 123. The creel stand 4 is drawn in a simplified manner in FIG. 13 to avoid complications in drawing.

The support frame 121 is a frame-shaped structure. One of the two core material support devices 2 is arranged within the creel stand 4 and at a center portion in the left-right direction of the support frame 121.

A large number of bobbin supporting parts 122 are arranged in the support frame 121. Bobbin (not shown) can be set to each of bobbin supporting parts 122. The fiber bundle F to be supplied to the winding unit 6 is wound onto the Bobbin.

The aligning guide 123 is mounted on a surface of the support frame 121 on a side close to the winding device 3 on the support frame 121. The aligning guide 123 has an opening 123a through which the core material 10 can pass. Various guide members which guide the fiber bundles F are mounted to the aligning guide 123 around the opening 123a. Examples of the guide members include a roller.

In this configuration, the fiber bundles F are drawn from the plurality of bobbins in the creel stand 4 and are aligned by the aligning guide 123. Thereafter, the fiber bundles F can be supplied to the 0° winding unit 6z of the winding device 3.

As described above, the filament winding apparatus 100 of this example includes rails 11, core material support devices 2, and the winding device 3. The rails 11 extend in the front-rear direction. The core material support devices 2 support the core material 10. The winding device 3 winds the fiber bundle F onto an outer peripheral surface of the core material 10. The winding device 3 includes the winding unit 6 and the main frame 32. The winding unit 6 has opening through which the core material 10 passes and guides the fiber bundle F. The winding unit 6 is mounted on the main frame 32. The main frame 32 is movable relative to the core material 10 in the front-rear direction. The main frame 32 is movable in the left-right direction that is orthogonal to the front-rear direction. The main frame 32 is rotatable around the rotational axis A1 extending in the vertical direction orthogonal to each of the front-rear direction and the left-right direction.

Accordingly, a position and a direction of the winding unit 6 can be changed with respect to the core material 10. Therefore, the fiber bundles F can be wound around the outer peripheral surface of the core material 10 which is curved.

The filament winding apparatus 100 of this example includes the front-rear traveling drive motor 91, the left-right traveling drive motor 92, the rotary drive motor 93, and the control device 5. The front-rear traveling drive motor 91 moves the winding device 3 in the front-rear direction. The left-right traveling drive motor 92 moves the main frame 32 in the left-right direction. The rotary drive motor 93 rotates the main frame 32 around the rotational axis A1. The control device 5 controls the front-rear traveling drive motor 91, the left-right traveling drive motor 92 and the rotary drive motor 93. The control device 5 controls operations of the front-rear traveling drive motor 91, the left-right traveling drive motor 92 and the rotary drive motor 93 to adjust a posture of the winding unit 6 such that the center of the opening 60 always coincides with the center of the core material 10.

Accordingly, the fiber bundles F can be wound automatically around the outer peripheral surface of the core material 10, while adjusting the posture of the winding unit 6 in accordance with a shape of the core material 10 which is curved.

In the filament winding apparatus 100 of this example, the main frame 32 includes the lifting frame 33. The lifting frame 33 is mounted to be movable in the vertical direction. The winding unit 6 is rotatably supported around the pitching axis A2 extending in the left-right direction by the lifting frame 33.

Accordingly, the position and the direction of the winding unit 6 can be changed in a three-dimensional manner with respect to the core material 10. Therefore, even if the core material 10 is curved in a three-dimensional manner, the fiber bundle F can be wound around the outer peripheral surface of the core material 10.

The filament winding apparatus 100 of this example includes the lifting motor 94, the pitching drive motor 95, and the control device 5. The lifting motor 94 moves the lifting frame 33 in the vertical direction. The control device 5 controls the lifting motor 94 and the pitching drive motor 95. The control device 5 controls operations of the lifting motor 94 and the pitching drive motor 95 to adjust a posture of the winding unit 6 such that the center of the opening 60 always coincides with the center of the core material 10.

Accordingly, the fiber bundles F can be wound automatically around the outer peripheral surface of the core material 10, while adjusting the posture of the winding unit 6 in accordance with the shape of the core material 10 which is curved in a three-dimensional manner.

In the filament winding apparatus 100 of this example, the helical winding unit 6y, which is a type of winding unit 6, includes the plurality of bobbin mounting parts 132, the helical winding circumference guiding parts 133 and the central guiding part 134. The bobbins on which the fiber bundles F are wound are mounted to the plurality of bobbin mounting parts 132. The helical winding circumference guiding parts 133 and the central guiding part 134 guide simultaneously the fiber bundles F from the bobbins which are mounted respectively to the plurality of bobbin mounting parts 132 to the core material 10.

Accordingly, the plurality of fiber bundles F can be guided preferably. The plurality of fiber bundles F can be wound simultaneously by a simple configuration.

In the filament winding apparatus 100 of this example, the 0° winding unit 6z, which is a type of winding unit 6, includes the 0° winding tightening part 160, the winding unit frame 63, and the fixed fiber bundle guiding part 150. The 0° winding tightening part 160 rotates around the center of the opening 60. The winding unit frame 63 supports the 0° winding tightening part 160 rotatably. The fixed fiber bundle guiding part 150 is fixed to the winding unit frame 63. The 0° winding tightening part 160 includes the tightening fiber bobbin supporting part 162, and the tightening fiber guiding part 170. The tightening fiber bobbin supporting part 162 supports the tightening fiber bobbin 169 on which the tightening material is wound. The tightening fiber guiding part 170 guides the tightening material to the core material 10. The fixed fiber bundle guiding part 150 simultaneously guides the plurality of fiber bundles F to the core material 10.

Accordingly, the 0° winding, in which the fiber orientation angle is 0° relative to the axial direction of the core material 10, can be easily performed.

The filament winding apparatus 100 of this example includes the creel stand 4 respectively supports bobbins on which the fiber bundles F are wound. The fiber bundles F are guided by the fixed fiber bundle guiding part 150.

Accordingly, the 0° winding unit 6z does not need to support bobbins. This can realize reduction in size and simplification of the winding device 3.

In the filament winding apparatus 100 of this example, the winding device 3 includes the base frame 31. The base frame 31 is mounted on the upper surface of the travel base 1 to be movable in the front-rear direction. The base frame 31 supports the main frame 32 from below in the vertical direction.

Accordingly, the stability of the main frame 32 can be improved.

Next, a second example will be described. FIG. 14 is a perspective view showing a filament winding apparatus 100x according to the second example. In a description of this example, members identical or similar to those of the above-described example are given the same corresponding reference numerals on the drawings, and descriptions thereof may be omitted.

In the filament winding apparatus 100x of this example, the base frame 31 provided in the winding device 3 is fixed on the upper surface of the travel base 1 to not be movable. On the other hand, the pair of core material support devices 2x is mounted to be movable in the front-rear direction along the rails 11. The front-rear traveling drive motor 91 and the front-rear traveling pinion 82 are mounted to the core material support devices 2, instead of the winding device 3.

In this example, the core material 10 is supported to be movable in the front-rear direction with respect to the winding device 3. Accordingly, even if the winding device 3 does not move in the front-rear direction, the winding device 3 can move relatively in the front-rear direction with respect to the core material 10. Therefore, the substantially same operation as in the first example can be realized.

In this example, core material support devices 2x support the core material 10 to be rotatable around an axis of both end portions which are supported. Core material support devices 2x can rotate the core material 10 around a supporting axis A4 which is an axis extending in the front-rear direction and passing supported portions of the core material 10.

A core material rotary drive motor (sixth drive source) 96 is provided in core material support devices 2x. The core material rotary drive motor 96 rotates the core material 10 around the supporting axis (third rotational axis) A4 extending in the front-rear direction. The core material rotary drive motor 96 is controlled by the control device 5.

In this configuration, rotation of the core material 10 can change a position and a direction of the core material 10 with respect to the winding device 3. Therefore, by appropriately rotating the core material 10 according to the shape of the core material 10, even if the core material 10 is curved in a complicated three-dimensional manner, for example, the fiber bundle F can be wound around the outer peripheral surface of the core material 10 in accordance with the shape.

As described above, in the filament winding apparatus 100x of this example, core material support devices 2x support the core material 10 rotatably around the supporting axis A4 extending in the front-rear direction. The core material support device 2x includes the core material rotary drive motor 96. The core material rotary drive motor 96 rotates the core material 10 around the supporting axis A4.

Accordingly, even if the core material 10 is curved in a complicated three-dimensional manner, for example, by rotating the core material 10 in accordance with the shape of the core material 10 (curvature), the posture of the core material 10 can be changed such that the winding device 3 winds the fiber bundles F easily. Therefore, the scope of application of the filament winding apparatus 100x can be expanded and the fiber bundles F can be wound on the core material 10 of various shapes.

Although a preferred example has been described above, the above-described configuration can be modified, for example, as follows.

In the filament winding apparatus 100, at least one of the two core material support devices 2 may be configured to move a position at which the core material 10 is support in the vertical direction. At least one of the two core material support devices 2 may be configured to move a position at which the core material 10 is support in the left-right direction. In this configuration, the core material 10 in which both ends in the front-rear direction are not positioned in a straight line, can be supported.

Core material support devices 2x may be configured to rotate the supported core material 10 around an axis different from the supporting axis A4.

The configuration of core material support devices 2x for driving the core material 10 in rotation may be applied to the filament winding apparatus 100 of a first example.

The configuration in which the core material 10 is supported to move in the front-rear direction with respect to the winding device 3, may be applied to the filament winding apparatus 100 of a first example.

The lifting frame 33 may be omitted, and then the winding unit 6 may be mounted to not be rotated relative to the main frame 32. In this example, the winding unit 6 cannot be moved up and down and cannot turn up and down. However, if the core material 10 is two-dimensionally curved, the fiber bundle F can be wound around the core material 10 without any problem.

The main frame 32 may be configured not to be movable in the left-right direction and not to be rotatable around the rotation axis A1. In this example, the fiber bundles F are wound onto the core material 10 by only vertical movement and pitching of the winding unit 6. In this modification, the vertical direction may be regarded as the second direction and the pitching axis may be regarded as the first rotational axis. Even with this configuration, the fiber bundle F can be wound if the core material 10 is two-dimensionally curved.

The front-rear traveling drive motors 91 may be mounted to the winding device 3 and the core material support devices 2 respectively.

In the above-described example, to three-dimensionally change the posture of the winding unit 6, a mechanism that realizes left-right motion and rotation around the rotational axis A1 is provided in the base frame 31. Such mechanism further includes a mechanism that realizes vertical motion and rotation around the pitching axis A2. However, the mechanism that realizes vertical motion and rotation around the pitching axis A2 may be provided in the base frame 31. Such mechanism may further include the mechanism that realizes left-right motion and rotation around the rotational axis A1.

In the 0° winding unit 6z, for example, a heat-shrinkable tape instead of fiber bundle can be wound for tightening.

The hoop winding unit 6x, the helical winding unit 6y, and the 0° winding unit 6z described above are merely illustrative ones. These may be changed to winding units of other configurations.

The invention claimed is:

1. A filament winding apparatus comprising a rail extending in a first direction, a core material support device that supports a core material, and a winding device that winds a fiber bundle onto an outer peripheral surface of the core material, the winding device comprising:
   a guide unit having an opening through which the core material passes, and guiding the fiber bundle; and
   a main frame on which the guide unit is mounted; wherein
   the main frame is movable relative to the core material in the first direction,
   the main frame is movable in a second direction orthogonal to the first direction, and
   the main frame is rotatable around a first rotational axis extending in a third direction orthogonal to each of the first direction and the second direction.

2. The filament winding apparatus according to claim 1, further comprising:
   a first drive source that moves at least any of the core material support device and the winding device in the first direction;
   a second drive source that moves the main frame in the second direction;
   a third drive source that rotates the main frame around the first rotational axis; and
   a control device that controls the first drive source, the second drive source, and the third drive source, wherein
   the control device controls operations of the first drive source, the second drive source, and the third drive source to adjust a posture of the guide unit such that a center of the opening always coincides with a center of the core material.

3. The filament winding apparatus according to claim 1, wherein
   the main frame comprises a sub frame that is mounted to be movable in the third direction, and
   the guide unit is rotatably supported around a second rotational axis extending in the second direction by the sub frame.

4. The filament winding apparatus according to claim 3, comprising:
   a fourth drive source that moves the sub frame in the third direction;
   a fifth drive source that rotates the guide unit around the second rotational axis; and
   a control device that controls the fourth drive source and the fifth drive source; wherein
   the control device controls operations of the fourth drive source and the fifth drive source to adjust a posture of the guide unit such that a center of the opening always coincides with a center of the core material.

5. The filament winding apparatus according to claim 1, wherein
   the core material support device supports the core material rotatably around a third rotational axis being parallel to the first direction, and
   the core material support device comprises a sixth drive source that rotates the core material around the third rotational axis.

6. The filament winding apparatus according to claim 1, wherein
   the guide unit comprises:
   a plurality of bobbin mounting parts for mounting bobbins on which the fiber bundles are wound; and a fiber bundle guiding part that simultaneously guides the fiber bundles from the bobbins mounted respectively by the plurality of bobbin support parts to the core material.

7. The filament winding apparatus according to claim 1, wherein the guide unit comprises:

a tightening part that rotates around a center of the opening;

a unit frame that rotatably supports the tightening part; and a fixed fiber bundle guiding part fixed on the unit frame, the tightening part comprises:

a bobbin supporting part that supports a tightening material bobbin on which a tightening material is wound; and a tightening material guiding part that guides the tightening material to the core material, and the fixed fiber bundle guiding part simultaneously guides the plurality of fiber bundles to the core material.

8. The filament winding apparatus according to claim 7, further comprising:

a creel stand that supports each of bobbins on which the fiber bundles are wound, the fiber bundles being guided by the fixed fiber bundle guiding part.

9. The filament winding apparatus according to claim 1, further comprising:

a base frame movable in the first direction relative to the core material, and the base frame supports the main frame from below.

* * * * *